(12) United States Patent
Aoki et al.

(10) Patent No.: US 10,819,717 B2
(45) Date of Patent: Oct. 27, 2020

(54) MALWARE INFECTED TERMINAL DETECTING APPARATUS, MALWARE INFECTED TERMINAL DETECTING METHOD, AND MALWARE INFECTED TERMINAL DETECTING PROGRAM

(71) Applicant: NIPPON TELEGRAPH AND TELEPHONE CORPORATION, Chiyoda-ku (JP)

(72) Inventors: Kazufumi Aoki, Musashino (JP); Kazunori Kamiya, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 97 days.

(21) Appl. No.: 15/522,147

(22) PCT Filed: Nov. 10, 2015

(86) PCT No.: PCT/JP2015/081659
§ 371 (c)(1),
(2) Date: Apr. 26, 2017

(87) PCT Pub. No.: WO2016/076334
PCT Pub. Date: May 19, 2016

(65) Prior Publication Data
US 2017/0339171 A1 Nov. 23, 2017

(30) Foreign Application Priority Data

Nov. 14, 2014 (JP) .................................. 2014-231618
Nov. 14, 2014 (JP) .................................. 2014-231619

(51) Int. Cl.
*H04L 29/06* (2006.01)
*G06F 21/56* (2013.01)

(52) U.S. Cl.
CPC .......... *H04L 63/1416* (2013.01); *G06F 21/56* (2013.01); *H04L 63/145* (2013.01)

(58) Field of Classification Search
CPC .... H04L 63/1416; H04L 63/145; G06F 21/56
See application file for complete search history.

(56) References Cited

U.S. PATENT DOCUMENTS 9,900,337 B2 * 2/2018 Gorny ................. H04L 63/1433
10,176,321 B2 * 1/2019 Abbasi .................. G06F 21/561
(Continued)

FOREIGN PATENT DOCUMENTS

JP 5009244 B2 8/2012

OTHER PUBLICATIONS

International Search Report dated Feb. 16, 2016, in PCT/JP2015/081659, filed Nov. 10, 2015.
(Continued)

*Primary Examiner* — Jahangir Kabir
(74) *Attorney, Agent, or Firm* — Oblon, McClelland, Maier & Neustadt, L.L.P.

(57) ABSTRACT

A detecting apparatus generates a collection of events, the collection being formed based on a predetermined condition, from events obtained for each identifier identifying a terminal in a monitoring target network or a piece of malware. The detecting apparatus then extracts, from a cluster formed of collections of events, the collections having a similarity therebetween equal to or larger than a certain similarity, events commonly appearing in the collections of events belonging to the same cluster, and extracts, according to a predetermined condition, the taken out events as a collection of detection purpose events. The detecting apparatus then detects that a malware infected terminal is present in the monitoring target network, if a generated collection of events based on communications in the monitoring target (Continued)

network is determined to match the extracted collection of detection purpose events.

10 Claims, 18 Drawing Sheets

(56) References Cited

U.S. PATENT DOCUMENTS

| | | | | |
|---|---|---|---|---|
| 2004/0111531 | A1* | 6/2004 | Staniford | H04L 29/06 709/246 |
| 2004/0199793 | A1* | 10/2004 | Wilken | H04L 29/12009 726/22 |
| 2007/0136455 | A1* | 6/2007 | Lee | G06F 21/564 709/223 |
| 2008/0244748 | A1* | 10/2008 | Neystadt | H04L 63/1425 726/25 |
| 2014/0165198 | A1 | 6/2014 | Altman | |
| 2015/0135262 | A1* | 5/2015 | Porat | G06F 21/552 726/1 |
| 2016/0065620 | A1* | 3/2016 | Liu | H04L 63/1408 726/1 |
| 2016/0164901 | A1* | 6/2016 | Mainieri | G06N 7/005 726/23 |
| 2016/0344758 | A1* | 11/2016 | Cohen | G06F 3/04842 |

OTHER PUBLICATIONS

Rieck et al., "Botzilla: Detecting the 'Phoning Home' of Malicious Software", Proceedings of the 2010 ACM Symposium on Applied Computing, 2010, p. 1978-1984.

Gu et al., "BotMiner: Clustering Analysis of Network Traffic for Protocol- and Structure-Independent Botnet Detection", Proceedings of the 17th USENIX Security Symposium, Jul. 28- Aug. 1, 2008, 17 pages.

Jacob et al., "JACKSTRAWS: Picking Command and Control Connections from Bot Traffic", Proceedings of the 20th USENIX Security Symposium, Aug. 8-12, 2011, 17 pages.

Chiba et al., Design and Evaluation of a Profiling Method to Detect Post-infection Communications, Computer Security Symposium 2014, Oct. 2014, 9 pages, with English abstract.

Nakata et al., "A Method of Extracting Common Malware Communication Patterns from Dynamic Analysis Result", Computer Security Symposium 2015, Oct. 2015, 9 pages, with English abstract.

"The Advanced Cyber Attack Landscape", http://www.fireeye.com/jp/ja/resources/pdfs/fireeye-advanced-cyber-attack-landscape.pdf, retrieved on Sep. 4, 2014, 16 pages.

"Annual Report Pandalabs 2013 Summary", http://press.pandasecurity.com/wp-content/uploads/2010/05/PandaLabs-Annual-Report_2013.pdf, retrieved on Sep. 3, 2014, 17 pages.

Garcia et al., "Survey on network-based botnet detection methods", Security and Communication Networks, 2013, 26 pages.

* cited by examiner

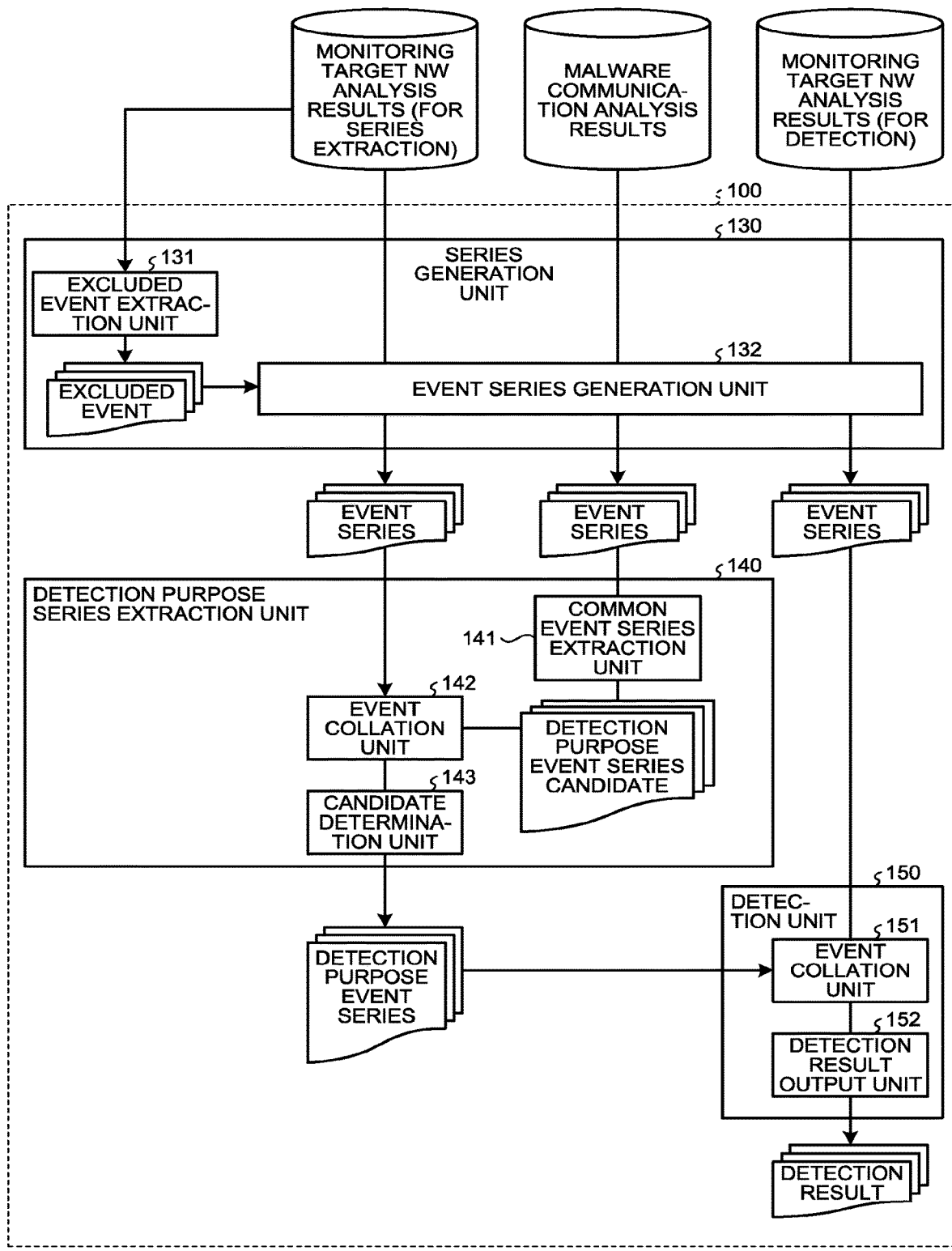

FIG.2

| IDENTIFIER OF HOST IN MONITORING TARGET NW | EVENT | EVENT OCCURRENCE TIME | ... |
|---|---|---|---|
| ... | ... | ... | ... |
| 192.168.10.11 | DETECTION OF COMMUNICATION WITH PARTICULAR COMMUNICATION DESTINATION | 2014/10/15 12:20:12 | ... |
| 192.168.10.11 | DETECTION OF COMMUNICATION FOR y TIMES IN X HOURS | 2014/10/15 12:20:15 | ... |
| 192.168.10.11 | DETECTION OF TRANSMISSION OF MALICIOUS DATA | 2014/10/15 12:20:20 | ... |
| ... | ... | ... | ... |

FIG.3

| MALWARE IDENTIFIER | EVENT | EVENT OCCURRENCE TIME | ... |
|---|---|---|---|
| ... | ... | ... | ... |
| E5fa44f2b31c1fb553b6021e7360d07d5d91ff5e | DETECTION OF COMMUNICATION WITH PARTICULAR COMMUNICATION DESTINATION | 2014/9/16 22:25:14 | ... |
| E5fa44f2b31c1fb553b6021e7360d07d5d91ff5e | DETECTION OF COMMUNICATION FOR Y TIMES IN X HOURS | 2014/9/16 22:25:16 | ... |
| E5fa44f2b31c1fb553b6021e7360d07d5d91ff5e | DETECTION OF TRANSMISSION OF MALICIOUS DATA | 2014/9/16 22:25:21 | ... |
| ... | ... | ... | ... |

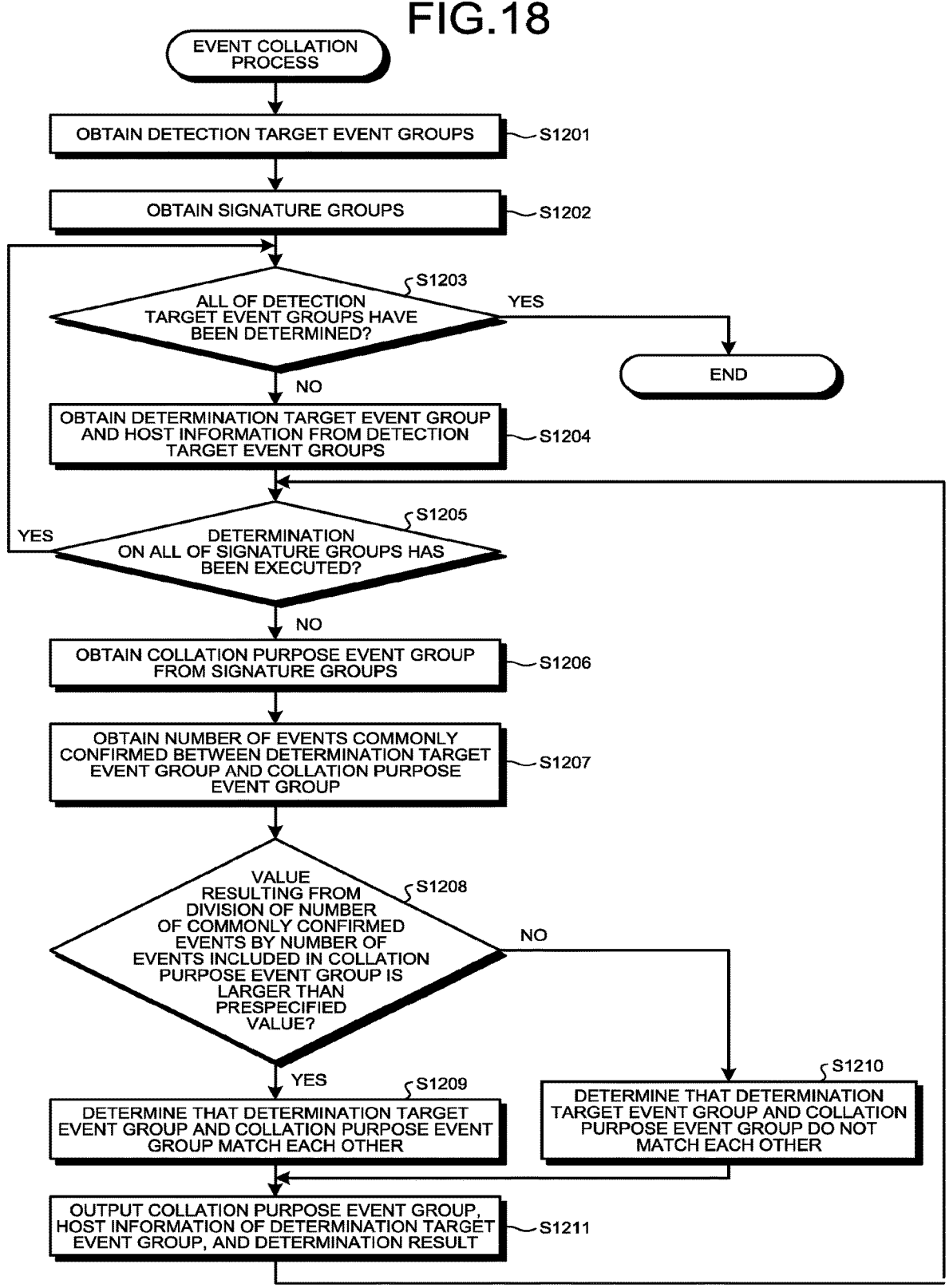

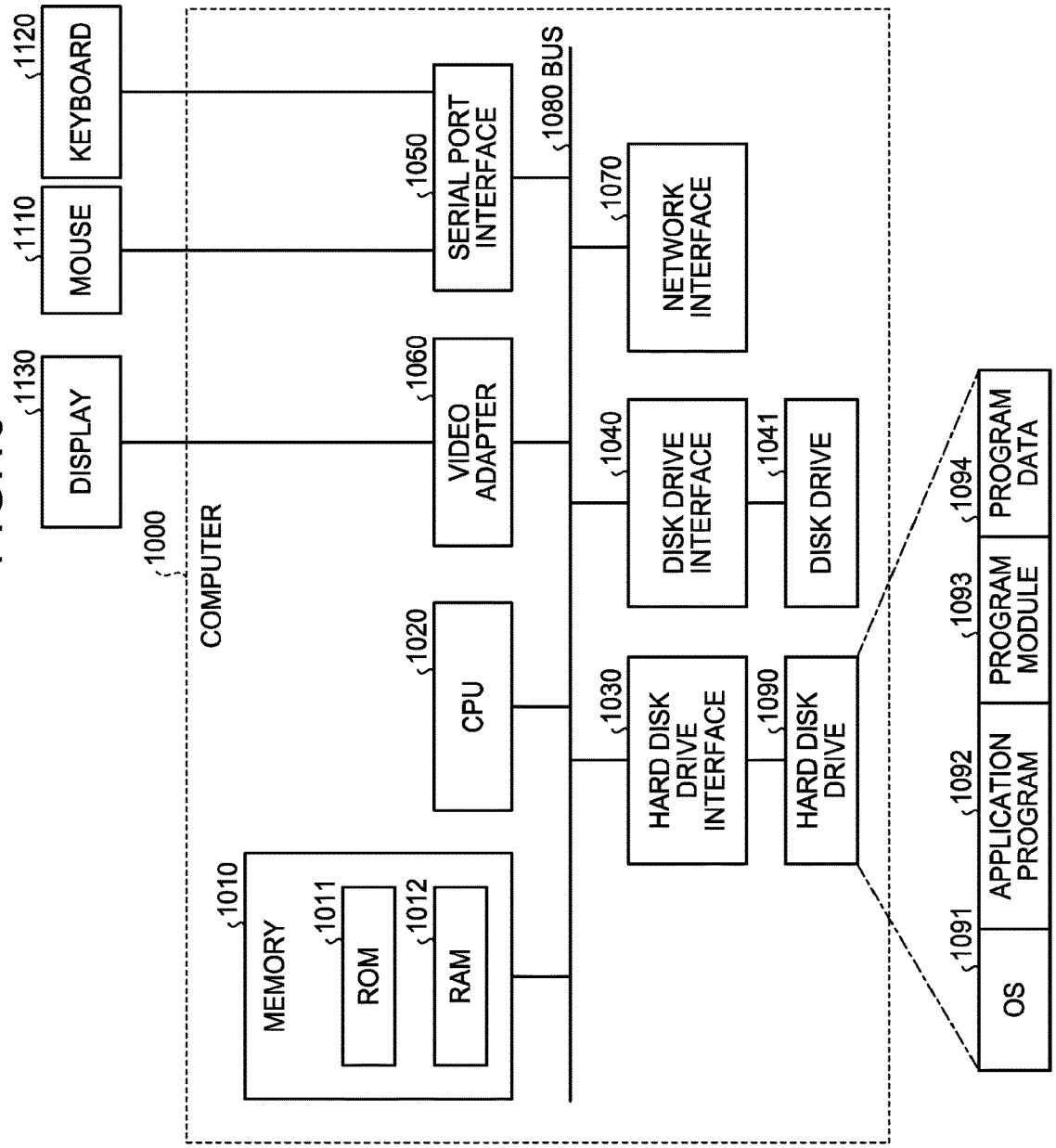

MALWARE INFECTED TERMINAL DETECTING APPARATUS, MALWARE INFECTED TERMINAL DETECTING METHOD, AND MALWARE INFECTED TERMINAL DETECTING PROGRAM

FIELD

The present invention relates to a malware infected terminal detecting apparatus, a malware infected terminal detecting method, and a malware infected terminal detecting program.

BACKGROUND

In recent years, malicious programs (hereinafter, referred to as "malware") that pose threats, such as information leakage and unauthorized access, have gone on a rampage. Malware receives commands from an attacker via a server or the like after infection, and poses threats, such as attack and information leakage. Recent malware uses a technique, in which communication with an attacker is disguised as authorized communication (for example, see Non-Patent Literature 1).

Increase in the number of pieces of malware discovered has also been notable, and it has been reported that a new piece of malware is generated every few seconds (for example, see Non-Patent Literature 2). Therefore, threats by malware are unable to be prevented just by countermeasures at a host side, such as antivirus software and the like. Accordingly, techniques for reducing threats of malware by analysis of communication data and identification of terminals infected with malware have attracted attention (for example, see Non-Patent Literature 3).

As a technique for detecting a terminal infected with malware, a technique has been known, in which patterning of communication characteristics seen in terminals infected with malware is performed and a terminal infected with malware is detected (for example, see Patent Literature 1). An example of the technique for detecting a terminal infected with malware is a technique, in which a terminal infected with malware is detected by: communication data being made a target of analysis; patterning of communication data obtained by malware analysis being performed; and comparison being performed such that whether the same pattern appears in communication in a monitoring target network (NW) is determined.

CITATION LIST

Patent Literature

Patent Literature 1: Japanese Patent No. 5009244

Non-Patent Literature

Non-Patent Literature 1: The Advanced Cyber Attack Landscape, [online], [Retrieved on Sep. 4, 2014], from the Internet <URL:http://www.fireeye.com/jp/ja/resources/pdfs/fireeye-advanced-cyber-attack-landscape.pdf>
Non-Patent Literature 2: Annual Report Pandalabs 2013 Summary, [online], [Retrieved on Sep. 3, 2014], from the Internet <URL:http://press.pandasecurity.com/wp-content/uploads/2010/05/PandaLabs-Annual-Report2013.pdf>
Non-Patent Literature 3: Sebastian Garcia et al., Survey on Network-Based Botnet Detection Methods, Security and Communication Networks 2013, [online], [Retrieved on Mar. 13, 2014], from the Internet <URL:http://onlinelibrary.wiley.com/doi/10.1002/sec.800/full>

SUMMARY

Technical Problem

However, the above mentioned conventional techniques have had the following problems. That is, since the number of pieces of malware has recently been enormous as described above, if patterning of all communications of all pieces of malware is performed, the number of patterns will become enormous, and determination of whether or not these patterns exist in communications of a network to be monitored will take a long time. Further, according to the above mentioned conventional techniques, since a state is defined for each communication payload and a transition of a state is treated as a pattern, a new pattern is generated just by a piece of malware communicating with a different communication payload. Further, since a communication similar to a communication of a terminal not infected with a communication of malware is also checked, when all of communication patterns are used in detection on communications in a network to be monitored, erroneous detection is induced.

Thus, the present invention aims to provide an apparatus, a method, and a program, for detecting a malware infected terminal, the apparatus, method, and program enabling the above described problems to be solved.

Solution to Problem

A malware infected terminal detecting apparatus includes: a generation unit that generates a collection of events, the collection being formed based on a predetermined condition, from events that are phenomena matching rules characterizing communications from communications in a monitoring target network and communications caused by malware and that are obtained for each identifier identifying a terminal in the monitoring target network or a piece of malware; an extraction unit that, for a cluster formed of collections of events that are based on the communications caused by malware, the collections having an event collection similarity therebetween equal to or larger than a certain similarity: when plural collections of events are present in the same cluster, takes out events appearing commonly in the collections of events belonging to the same cluster, and extracts, according to a predetermined condition, a collection of the taken out events as a collection of detection purpose events; or when only a single collection of events is present in the same cluster, extracts the collection of events as a collection of detection purpose events if a predetermined condition is satisfied; and a detection unit that detects that a malware infected terminal is present in the monitoring target network, if a collection of events generated by the generation unit and based on the communications in the monitoring target network has been determined to match the collection of detection purpose events extracted by the extraction unit.

Advantageous Effects of Invention

According to the present invention, patterns to be subjected to collation for a monitoring target NW are able to be reduced, time taken for the collation is able to be reduced, and further, erroneous detection of communications normally occurring in the monitoring target NW is able to be reduced.

BRIEF DESCRIPTION OF DRAWINGS

FIG. 1 is a block diagram illustrating an outline of a detecting apparatus according to a first embodiment.

FIG. 2 is a diagram illustrating an example of monitoring target NW analysis results, according to the first embodiment.

FIG. 3 is a diagram illustrating an example of malware communication analysis results, according to the first embodiment.

FIG. 18 is a flow chart illustrating a sequence of a collation process by the event collation unit.

FIG. 19 is a diagram illustrating a computer that executes a malware infected terminal detecting program.

DESCRIPTION OF EMBODIMENTS

Figure 4:
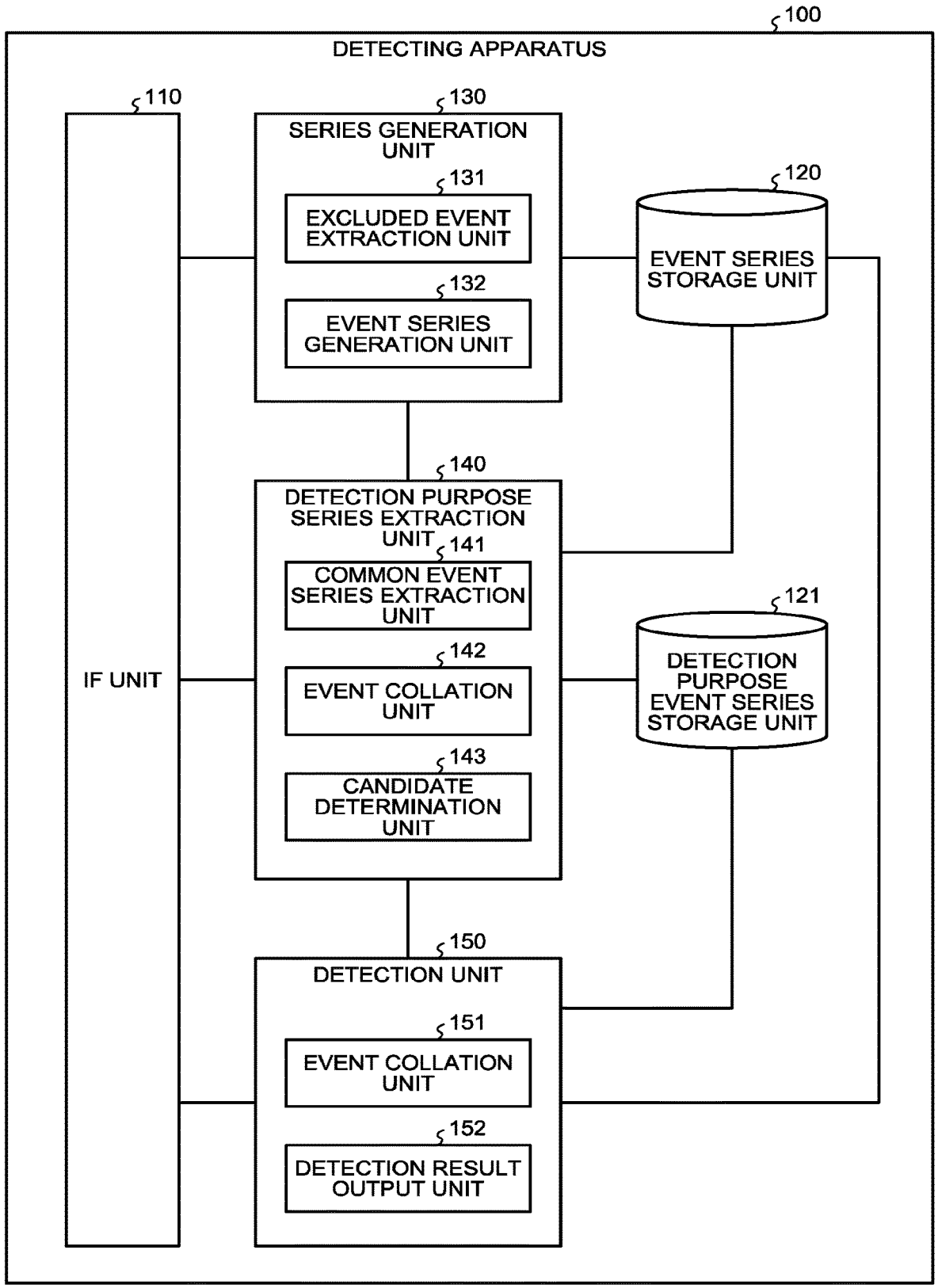
FIG. 4 is a diagram illustrating an example of a configuration of the detecting apparatus according to the first embodiment.

Hereinafter, embodiments of a malware infected terminal detecting apparatus, a malware infected terminal detecting method, and a malware infected terminal detecting program, according to the present application, will be described in detail, based on the drawings. The malware infected terminal detecting apparatus, the malware infected terminal detecting method, and the malware infected terminal detecting program, according to the present application, are not limited by these embodiments.

First Embodiment

In the following embodiment, a configuration of a detecting apparatus according to a first embodiment and flows of processing by the detecting apparatus according to the first embodiment, will be described in order, and effects according to the first embodiment will be described lastly.

[Outline of First Embodiment]

Firstly, by use of FIG. 1, an outline of processing executed by a detecting apparatus 100, which is a malware infected terminal detecting apparatus, will be described. FIG. 1 is a block diagram illustrating an outline of the detecting apparatus 100 according to the first embodiment. As illustrated in FIG. 1, the processing by the detecting apparatus 100 is executed by a series generation unit 130, a detection purpose series extraction unit 140, and a detection unit 150, which the detecting apparatus 100 has. The detecting apparatus 100 detects any terminal (host) infected with malware in a monitoring target NW, by: generating detection purpose event series from monitoring target network (NW) analysis results (for series extraction), which have been collected in advance before the detecting, and malware communication analysis results; and collating event series generated from monitoring target NW analysis results (for detection) with the detection purpose event series.

The monitoring target NW analysis results (for series extraction, and for detection) store therein data having fields for: identifiers identifying hosts in the monitoring target NW; events; and event occurrence times. An event means a phenomenon capturing each of certain characteristics when the certain characteristics are able to be confirmed in communications. For example, an event is: a phenomenon where a communication with a particular communication destination is included as a result of analysis of a device log recorded in a firewall, a Web proxy, or the like; a phenomenon where a certain number of communications or more have been performed in a predetermined time period; or a phenomenon where malicious data transmission has been detected by an intrusion detection system (IDS). That is, an event is a phenomenon that matches a rule enabling the phenomenon to be characterized as a communication that is highly probable to be a malicious communication, the communication being from communications in a monitoring target NW. For example, a predetermined external device performs analysis of whether or not a rule characterizing communications is matched, and the detecting apparatus 100 obtains, as a monitoring target NW analysis result, any event determined to match the rule. A malware communication analysis result is a result of analysis of communication data upon actual operation of malware, from a viewpoint similar to that for when the above described monitoring target NW analysis result is obtained. Further, an event series is monitoring target NW analysis results that have been arranged along a time series for each host of a monitoring target NW, or malware communication analysis results that have been arranged along a time series for each piece of malware to be analyzed.

An example of the monitoring target NW analysis results will be illustrated by use of FIG. 2. FIG. 2 is a diagram illustrating the example of the monitoring target NW analysis results according to the first embodiment. As illustrated in FIG. 2, events detected for each of identifiers of hosts in a monitoring target NW are stored in association with types of the events, and event occurrence times. For example, FIG. 2 illustrates an example where at a host identified by "192.168.10.11"; an event, "detection of communication with particular communication destination", occurred at "twenty minutes and twelve seconds past twelve, on Oct. 15, 2014". Next, by use of FIG. 3, an example of the malware communication analysis results will be illustrated. FIG. 3 is a diagram illustrating the example of the malware communication analysis results according to the first embodiment. As illustrated in FIG. 3, similarly to the monitoring target NW analysis results, events detected for each malware identifier are stored in association with types of the events, and event occurrence times.

Hereinafter, processing executed by the detecting apparatus 100 will be described along a flow thereof. The series generation unit 130 pertaining to the detecting apparatus 100 includes an excluded event extraction unit 131 and an event series generation unit 132, has the monitoring target NW analysis results and the malware communication analysis results as inputs, and generates event series for each of the monitoring target NW analysis results and the malware communication analysis results. The series generation unit 130 generates a collection of events formed based on a predetermined condition, from events, which are phenomena matching rules characterizing communications, from communications in the monitoring target NW and communications caused by malware, and which are obtained for each identifier identifying a terminal in the monitoring target NW or a piece of malware. For example, the series generation unit 130 generates, as a collection of events, an event series formed based on order of occurrence of the events. Hereinafter, the excluded event extraction unit 131 and the event series generation unit 132 will be described.

Specifically, when the monitoring target NW analysis results (for series extraction) are input, the excluded event extraction unit 131 sets, as an excluded event, any event in the analysis results, the event having been confirmed in many hosts in the monitoring target NW.

The event series generation unit 132 generates an event series formed of events that are not excluded events, from the monitoring target NW analysis results and the malware communication analysis results. Generally, since there are few infected terminals in a monitoring target NW, any event confirmed in many hosts is able to be determined as not capturing a characteristic of communications by malware. Thus, by excluding excluded events, the event series generation unit 132 is able to generate an event series without events confirmed in terminals not infected with malware. That is, the event series generation unit 132 enables reduction of erroneous detection in detection of any infected terminal.

Further, the event series generation unit 132 generates one event series from events with occurrence intervals therebetween that are equal to or less than a certain time period, from events of the same host or same piece of malware. That is, the event series generation unit 132 generates an event series by separating a series of phenomena related to operation of malware. Further, the event series generation unit 132 generates an event series by excluding any redundant event from events of the same host or same piece of malware.

A specific example of processing by the event series generation unit 132 will be described. For example, it will be assumed that as analysis results of a certain host, an event A, an event B, and an event C have been confirmed in order of "ABCABCAA". For example, the event A is an event indicating access to a particular server, the event B is an event indicating that a file is downloaded from the particular server, and the event C is an event indicating that a predetermined server has been accessed based on the file downloaded in the event B. The event series generation unit 132 then excludes redundant events from the series of events, "ABCABCAA". That is, the event series generation unit 132 generates an event series, "ABC", from "ABCABCAA". In other words, the event series generation unit 132 adds events of a certain host from the event with the earliest occurrence time in order, as elements of an event series, and any event confirmed for the second time or more is not added to the event series.

Thereby, the event series generation unit 132 is able to generate an event series absorbing a difference in the number of repetitions even if repetitive communications are occurring due to a malware execution timing, a command from a command and control (C & C) server, or the like. That is, the event series generation unit 132 enables accuracy in a later described detection process to be improved.

Next, processing by the detection purpose series extraction unit 140 pertaining to the detecting apparatus 100 will be described. The detection purpose series extraction unit 140 includes a common event series extraction unit 141, an event collation unit 142, and a candidate determination unit 143, and extracts a detection purpose event series, based on event series generated by the series generation unit 130. For a cluster formed of collections of events, which are based on communications caused by malware and have event collection similarities therebetween equal to or larger than a certain similarity: when plural collections of events are present in the same cluster, the detection purpose series extraction unit 140 takes out any event that appears commonly to the collections of events belonging to the same cluster, and extracts, according to a predetermined condition, a collection of the taken out events as a collection of detection purpose events; or when only a single collection of events is present in the same cluster, the detection purpose series extraction unit 140 extracts the collection of events as a collection of detection purpose events if a predetermined condition is satisfied. Hereinafter, the common event series extraction unit 141, the event collation unit 142, and the candidate determination unit 143 will be described.

Specifically, after calculating similarities between event series extracted from malware communication analysis results, the common event series extraction unit 141 executes clustering. Thereafter, the common event series extraction unit 141 extracts, from event series having similarities therebetween that are equal to or larger than a certain similarity, as a detection purpose event series candidate, in consideration of their order, any event confirmed commonly to the respective event series.

The event collation unit 142 collates event series of monitoring target NW analysis results (for series extraction) with detection purpose event series candidates, and calculates to what extent each detection purpose event series candidate enables hosts in the monitoring target NW to be detected.

Based on the number of detected hosts for each detection purpose event series candidate calculated by the event collation unit 142, the candidate determination unit 143 outputs the detection purpose event series candidate as a detection purpose event series, if a rate of the number of detected hosts to the total number of hosts in the monitoring target NW is equal to or less than a certain rate.

Next, processing by the detection unit 150 pertaining to the detecting apparatus 100 will be described. The detection unit 150 includes an event collation unit 151 and a detection result output unit 152, and detects any malware infected terminal in the monitoring target NW. If it is determined that a collection of events based on communications of the monitoring target NW generated by the series generation unit 130 matches a collection of detection purpose events extracted by the detection purpose series extraction unit 140, the detection unit 150 detects that a malware infected terminal is present in the monitoring target NW. Hereinafter, the event collation unit 151 and the detection result output unit 152 will be described.

Specifically, similarly to the event collation unit 142 of the detection purpose series extraction unit 140, the event collation unit 151 performs collation of whether the event series generated from the monitoring target NW analysis results (for detection) match the detection purpose event series.

The detection result output unit 152 outputs host information that has been determined to match the detection purpose event series as a result of the collation by the event collation unit 151. Host information is, for example, an Internet Protocol (IP) address of a terminal in the monitoring target NW.

As described above, the detecting apparatus 100 generates detection purpose event series from monitoring target NW analysis results (for series extraction) and malware communication analysis results, and collates event series generated from monitoring target NW analysis results (for detection) with the detection purpose event series, to thereby detect any terminal infected with malware in a monitoring target NW.

As described above, the detecting apparatus 100 according to the first embodiment performs detection of any infected terminal by using only detection purpose event series, which are time series patterns of common characteristics characterizing malware, from communications of plural pieces of malware. Therefore, patterns for collation in a monitoring target NW are able to be reduced, and time taken for the collation is able to be reduced. Further, since the detecting apparatus 100 uses detection purpose event series, from which any event or any event time series that is observable in a monitoring target NW has been excluded in advance, erroneous detection of communications that normally occur in the monitoring target NW is able to be reduced.

In generating a detection purpose event series, the detecting apparatus 100 may use only malware communication analysis results, without using monitoring target NW analysis results (for series extraction). Further, details of processing pertaining to the detecting apparatus 100 will be described later by use of flow charts.

[Configuration of Detecting Apparatus According to First Embodiment]

Next, by use of FIG. 4, the detecting apparatus 100 according to the first embodiment will be described. FIG. 4 is a diagram illustrating an example of a configuration of the detecting apparatus 100 according to the first embodiment.

As exemplified by FIG. 4, the detecting apparatus 100 according to the first embodiment has an interface (IF) unit 110, an event series storage unit 120, a detection purpose event series storage unit 121, the series generation unit 130, the detection purpose series extraction unit 140, and the detection unit 150.

The IF unit 110 is, for example, a network interface card (NIC), and transmits and receives various data to and from an external device. For example, the IF unit 110 receives, as monitoring target NW analysis results, results of analysis of device logs and the like of any firewalls and Web proxies installed in a monitoring target NW.

The event series storage unit 120 and the detection purpose event series storage unit 121 are each realized by, for example: a semiconductor memory element, such as a random access memory (RAM) or a flash memory; or a hard disk, an optical disk, or the like. The event series storage unit 120 and the detection purpose event series storage unit 121 store therein, as appropriate, information handled by the series generation unit 130, the detection purpose series extraction unit 140, and the detection unit 150.

For example, the event series storage unit 120 stores therein event series generated by the series generation unit 130. Further, the detection purpose event series storage unit 121 stores therein detection purpose event series extracted by the detection purpose series extraction unit 140. The detecting apparatus 100 does not necessarily have the event series storage unit 120 or the detection purpose event series storage unit 121 as a component thereof. For example, the detecting apparatus 100 may use an external storage device that executes processing that is similar to that of the event series storage unit 120 or the detection purpose event series storage unit 121.

The series generation unit 130, the detection purpose series extraction unit 140, and the detection unit 150 are realized by, for example, an integrated circuit, such as an application specific integrated circuit (ASIC), or a field programmable gate array (FPGA). Further, the series generation unit 130, the detection purpose series extraction unit 140, and the detection unit 150 are realized by, for example, a program stored in a storage device not illustrated, the program being executed by a central processing unit (CPU), a micro processing unit (MPU), or the like, with a RAM being a work area.

The series generation unit 130 includes the excluded event extraction unit 131 and the event series generation unit 132, has monitoring target NW analysis results and malware communication analysis results as inputs, and generates event series for each of the monitoring target NW analysis results and the malware communication analysis results. When monitoring target NW analysis results (for series extraction) are input, the excluded event extraction unit 131 sets, as an excluded event, any event in the analysis results, the event having been confirmed in many hosts in the monitoring target NW. Specifically, the excluded event extraction unit 131 obtains the total number of hosts in the monitoring target NW included in the input monitoring target NW analysis results (for series extraction), and the number of hosts including a predetermined event. Subsequently, the excluded event extraction unit 131 sets the predetermined event as an excluded event, if, based on a rate of the number of hosts including the predetermined event, to the total number of hosts, the hosts including the predetermined event exceed a certain rate. Thereby, the excluded event extraction unit 131 enables an event series to be generated, just with events excluding general processes that are executed in many hosts.

The event series generation unit 132 generates event series formed of events that are not excluded events, from monitoring target NW analysis results and malware communication analysis results. Specifically, the event series generation unit 132 obtains, as an input, any event that is not an excluded event, from the monitoring target NW analysis results or the malware communication analysis results. Upon the obtainment, the event series generation unit 132 records an event occurrence time of the read event. The event series generation unit 132 then determines whether the recorded event occurrence time is away from the most recent previously read event occurrence time by a certain time period or more. If the event occurrence time is not away from the most recent previous event time by the certain time period or more, the event series generation unit 132 presumes that the event is an element of the same event series as that of the preceding event, and generates the events that have been subjected to the determination as the event series. As described above, since the event series generation unit 132 generates an event series with events excluding general processes, the event series generation unit 132 enables reduction of erroneous detection in detection of any infected terminal.

The detection purpose series extraction unit 140 includes the common event series extraction unit 141, the event collation unit 142, and the candidate determination unit 143, and extracts a detection purpose event series, based on event series generated by the series generation unit 130.

The common event series extraction unit 141 extracts a detection purpose event series candidate from the event series generated by the series generation unit 130. Specifically, the common event series extraction unit 141 performs clustering after calculating similarities between event series extracted from malware communication analysis results; and from event series having similarities therebetween that are equal to or larger than a certain similarity, extracts, in consideration of order thereof, any event confirmed commonly to the respective event series. When the events are arranged in time series order and a length of the events that have been able to be confirmed commonly is longer than a predetermined length, the common event series extraction unit 141 determines an event series formed of the commonly confirmed events as a detection purpose event series candidate. As described above, by clustering event series and determining a common event as an element of a detection purpose event series candidate; even in a case where a subspecies of malware that performs similar operation is generated, the common event series extraction unit 141 enables determination by the detection unit 150 to be implemented with the same event series if a characteristic common to communications is seen. That is, even under a situation where a subspecies of malware is frequently generated, since the common event series extraction unit 141 does not need to prepare many event series to be used in detection, efficiency of detection processing is able to be improved, and subspecies of malware are able to be widely dealt with. Further, by using only common event series, the detecting apparatus 100 enables the number of event series to be subjected to collation determination to be reduced and the processing time to be reduced.

The event collation unit 142 collates event series of monitoring target NW analysis results (for series extraction) with detection purpose event series candidates, and calculates to what extent each detection purpose event series candidate enables hosts in the monitoring target NW to be detected. Specifically, the event collation unit 142 obtains, as inputs, event series of monitoring target NW analysis results (for series extraction) generated by the series generation unit 130, and a detection purpose event series candidate extracted by the common event series extraction unit 141. The event collation unit 142 then collates these event series with each other, and calculates the number of hosts corresponding to the monitoring target NW analysis results (for series extraction) determined to be matching. The event collation unit 142 then outputs the calculated number of hosts as an output to the candidate determination unit 143.

Based on the number of detected hosts for each detection purpose event series candidate calculated by the event collation unit 142, the candidate determination unit 143 outputs the detection purpose event series candidate as a detection purpose event series, if a rate of the number of detected hosts to the total number of hosts in the monitoring target NW is equal to or less than a certain rate. Specifically, the candidate determination unit 143 divides the number of detected hosts for the detection purpose event series candidate determined to match the event series by the event collation unit 142, by the total number of hosts in the monitoring target NW, to thereby calculate the rate of detected hosts for each event series. The candidate determination unit 143 then outputs, as a detection purpose event series, any event series, for which the rate of detected hosts is equal to or less than the certain rate, from the detection purpose event series candidates. Thereby, similarly to the processing by the excluded event extraction unit 131, the candidate determination unit 143 is able to exclude those that may lead to erroneous detection from detection event series in advance, in consideration of the fact that in general, a monitoring target NW has few terminals infected with malware. Thus, the processing by the candidate determination unit 143 enables reduction of erroneous detection in detection of any infected terminal in a monitoring target NW.

The detection unit 150 includes the event collation unit 151 and the detection result output unit 152, and detects any malware infected terminal in a monitoring target NW. Specifically, the event collation unit 151 performs collation of whether event series of monitoring target NW analysis results (for detection) and a detection purpose event series match each other. The detection result output unit 152 outputs host information that has been determined to match the detection purpose event series as a result of the collation by the event collation unit 151. In other words, the detection result output unit 152 detects a malware infected terminal, by outputting, with respect to a host determined to match a detection purpose event series that is a signature, information enabling the host to be identified, the host being determined to match the detection purpose event series, as a host highly likely to be a malware infected terminal.

[Sequence of Processing of First Embodiment]

Next, sequences of detecting processing by the above described detecting apparatus 100 will be described in detail.

(Excluded Event Extraction Process)

Figure 5:
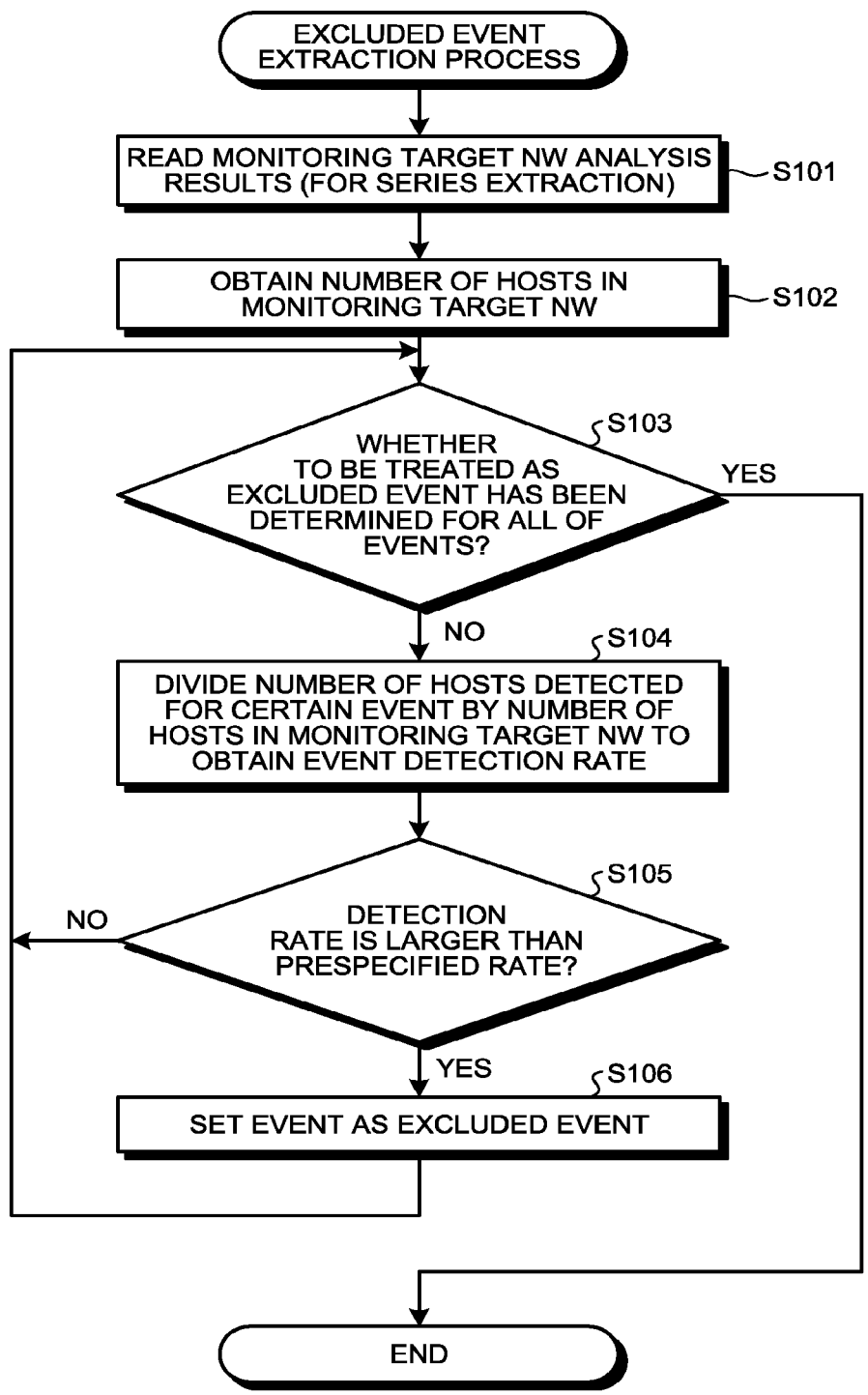
FIG. 5 is a flow chart illustrating a sequence of an excluded event extraction process by an excluded event extraction unit.

Firstly, by use of FIG. 5, an excluded event extraction process executed by the excluded event extraction unit 131 will be described. FIG. 5 is a flow chart illustrating a sequence of the excluded event extraction process by the excluded event extraction unit 131 according to the first embodiment.

As illustrated in FIG. 5, the excluded event extraction unit 131 reads monitoring target NW analysis results (for series extraction) as an input (Step S101). The excluded event extraction unit 131 obtains the number of hosts in a monitoring target NW (Step S102). The number of hosts in the monitoring target NW may be the number of hosts present in the monitoring target NW if the number is known in advance, or the number of hosts appearing in the monitoring target NW analysis results (for series extraction) may be regarded as the number of hosts in the monitoring target NW. In other words, the number of hosts in the monitoring target NW is the total number of hosts observable in the monitoring target NW, and if the total number of hosts present therein has been observed in advance, that total number of hosts is used, and if the total number of hosts is unknown, the total number of observable hosts is used from the monitoring target NW analysis results (for series extraction).

Subsequently, the excluded event extraction unit 131 determines whether or not processing, in which whether an event is to be made an excluded event is determined, has been executed for all of events included in the read monitoring target NW analysis results (for series extraction) (Step S103). If it is determined that the processing has been executed for all of the events, the excluded event extraction process is ended (Step S103; Yes).

On the contrary, if it is determined that the processing has not been executed for all of the events (Step S103; No), the excluded event extraction unit 131 continues the excluded event extraction process. The excluded event extraction unit 131 then divides the number of hosts detected for a certain event, by the number of hosts in the monitoring target NW, and obtains a detection rate for the event (Step S104).

The excluded event extraction unit 131 then determines whether or not the detection rate is larger than a prespecified value (Step S105). If the excluded event extraction unit 131 determines that the detection rate is larger than the prespecified value (Step S105; Yes), the excluded event extraction unit 131 sets the event being subjected to the determination as an excluded event (Step S106). On the contrary, if the excluded event extraction unit 131 determines that the detection rate is not larger than the prespecified value (Step S105; No), without setting that event as an excluded event, the excluded event extraction unit 131 continues processing for a different event (proceeding to Step S103).

As described above, the excluded event extraction unit 131 determines that any event confirmed in many of the hosts does not capture only characteristics of communications due to malware, extracts that event, and sets the event as an excluded event. Thereby, the excluded event extraction unit 131 enables reduction of erroneous detection in the infected terminal detecting process.

(Event Series Generation Process)

Figure 6:
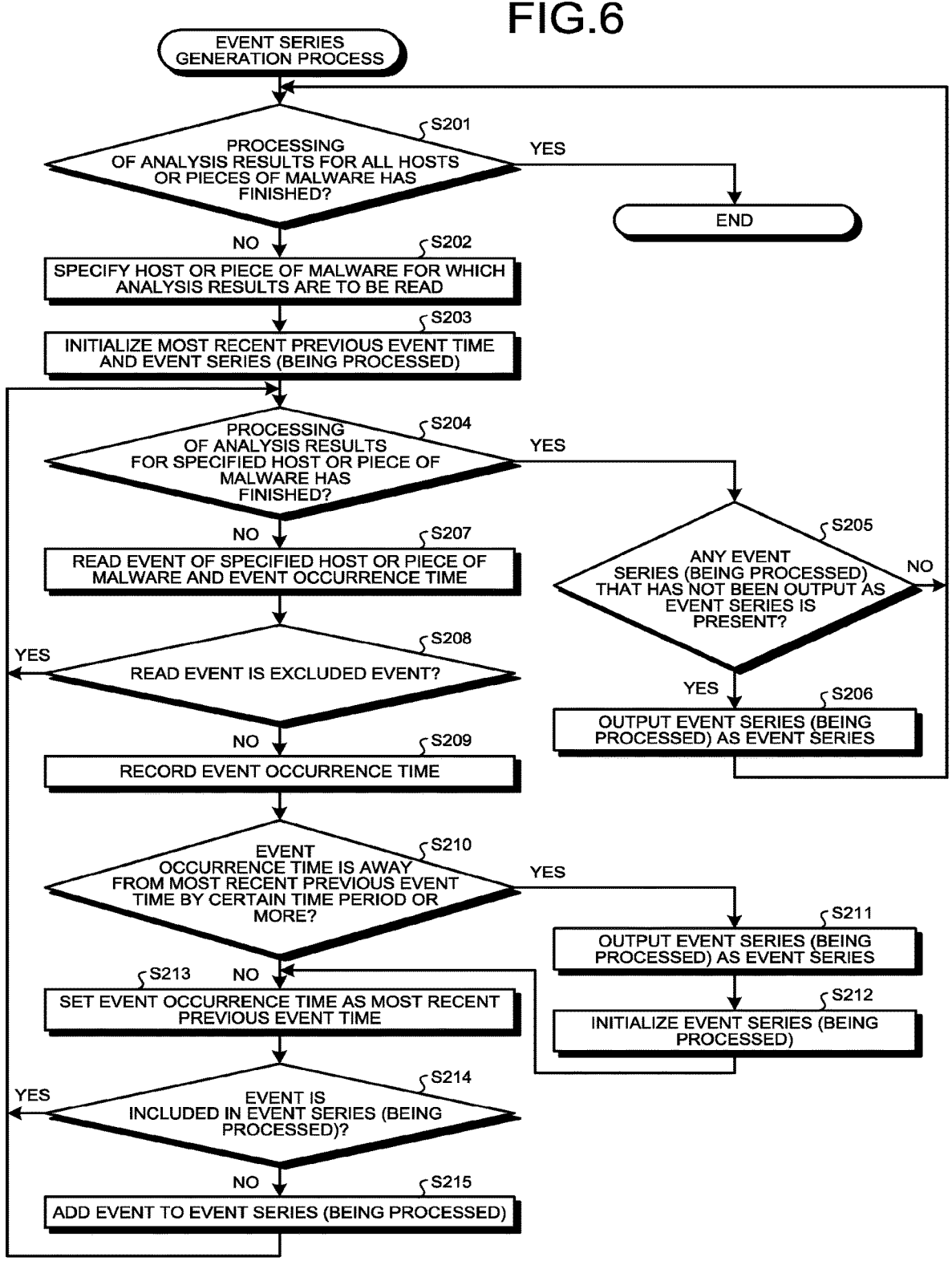
FIG. 6 is a flow chart illustrating a sequence of an event series generation process by an event series generation unit.

Next, by use of FIG. 6, an event series generation process executed by the event series generation unit 132 will be described. FIG. 6 is a flow chart illustrating a sequence of the event series generation process by the event series generation unit 132.

As illustrated in FIG. 6, the event series generation unit 132 determines whether or not analysis results for all of hosts or pieces of malware have been processed, with respect to the event series generation process for monitoring target NW analysis results (for series extraction and for detection) and malware communication analysis results (Step S201). If it is determined that the processing has been executed for all, the event series generation process is ended (Step S201; Yes).

On the contrary, if it is determined that processing of the analysis results for all of the hosts or pieces of malware has not finished (Step S201; No), the event series generation unit 132 specifies a host or a piece of malware, for which the analysis results are to be read (Step S202). When extracting event series from the monitoring target NW analysis results, the event series generation unit 132 performs generation of event series per host in the monitoring target NW. For identification of a host, for example, an IP address of the host is used. Further, when generating event series from malware communication analysis results, the event series generation unit 132 performs generation of event series per piece of malware. For identification of a piece of malware, for example, a hash value of the piece of malware is used. Both the monitoring target NW analysis results and the malware communication analysis results are sorted by times at which the events were confirmed.

The event series generation unit 132 initializes the most recent previous time and the event series (being processed), before the processing described below (Step S203).

Firstly, the event series generation unit 132 determines whether or not processing of analysis results for a specified host or piece of malware has finished (Step S204). If it is determined that the processing of the analysis results has finished (Step S204; Yes), the event series generation unit 132 determines whether or not any event series that has not been output as an event series (that is, any event series being subjected to generation processing) is present (Step S205). If an event series that has not been output as an event series is present (Step S205; Yes), the event series generation unit 132 outputs the event series being processed as an event series (Step S206).

On the contrary, if an event series being processed, which has not been output as an event series, is not present (Step S205; No), the event series generation unit 132 advances the process to Step S201.

At Step S204, if it is determined that the processing of the analysis results has not finished (Step S204; No), the event series generation unit 132 reads an event and an event occurrence time of the specified host or piece of malware (Step S207). The event series generation unit 132 then determines whether or not the read event corresponds to an excluded event (Step S208). If the event corresponds to an excluded event (Step S208; Yes), the event series generation unit 132 advances the process to Step S204 without adding the read event to the event series.

On the contrary, if the read event does not correspond to an excluded event (Step S208; No), the event series generation unit 132 records the event occurrence time of the read event (Step S209). The event series generation unit 132 then determines whether the recorded event occurrence time is away from the most recent previous event time by a certain time period or more (Step S210).

If the event occurrence time is away from the most recent previous event time by the certain time period or more (Step S210; Yes), the read event will be added to an event series that is different from the event series being processed, and thus the event series generation unit 132 outputs the event series being processed as an event series (Step S211). In this case, the event series generation unit 132 initializes the event series (being processed) that has been output (Step S212).

At Step S210, if the event occurrence time is not away from the most recent previous event time by the certain time period or more (Step S210; No), the event series generation unit 132 sets the event occurrence time of the read event as the most recent previous event time (Step S213). In other words, if the event occurrence time is not away from the most recent previous event time by the certain time period or more, the event series generation unit 132 presumes that the event is an element of the same event series as that of that preceding event, and determines whether to add the event to the event series (being processed) (later described Step S214).

The event series generation unit 132 then determines whether or not the read event is included in the event series (being processed) (Step S214). If the read event is included in the event series (being processed) (Step S214; Yes), since the event series generation unit 132 does not add any redundant event to the event series (being processed), the process is advanced to Step S204.

On the contrary, if the read event is not included in the event series (being processed) (Step S214; No), the event series generation unit 132 adds the event to the event series (being processed) (Step S215). Thereafter, the event series generation unit 132 advances the process to Step S204.

As described above, if the read event corresponds to an excluded event, the event series generation unit 132 does not incorporate that event into the event series. Further, the event series generation unit 132 records the time, at which the event occurred, compares the time, at which the event occurred, with a time, at which a preceding event occurred, and determines whether these events are away from each other by a certain time period or more. Thereby, the event series generation unit 132 generates event series, such that each event series is formed of events with short occurrence intervals between the events. Further, the event series generation unit 132 determines whether or not the event to be processed is included in the event series (being processed), and if the event is included therein, the event series generation unit 132 does not add that event to the event series. That is, no redundant events are present in the generated event series. The determination of whether or not to add any redundant event to an event series (being processed) (Step S214) may be not performed, in consideration of characteristics of monitoring target NW analysis results and malware communication analysis results. For example, if there are few types of events confirmed in monitoring target NW analysis results and malware communication analysis results (for example, if there is only one type), without the determination of whether or not any redundant event is to be added to an event series (being processed), all of events that are not excluded events may be added to the event series (being processed).

(Common Event Series Extraction Process)

Figure 7:
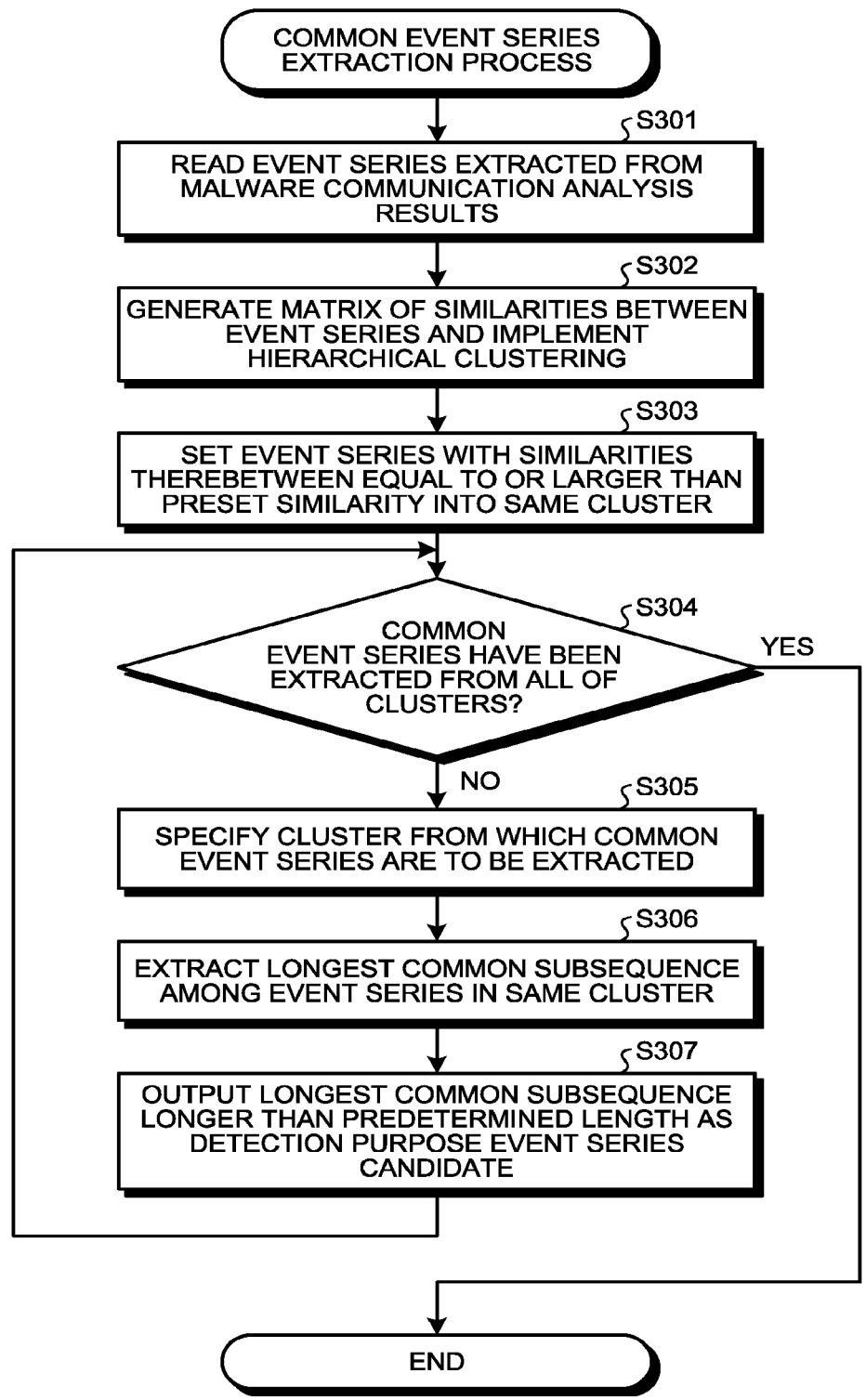
FIG. 7 is a flow chart illustrating a sequence of a common event series extraction process by a common event series extraction unit.

Next, by use of FIG. 7, a common event series extraction process executed by the common event series extraction unit 141 will be described. FIG. 7 is a flow chart illustrating a sequence of the common event series extraction process by the common event series extraction unit 141.

As illustrated in FIG. 7, the common event series extraction unit 141 reads event series extracted from malware communication analysis results as targets to be processed (Step S301). The common event series extraction unit 141 then generates a matrix of similarities between the event series, and implements hierarchical clustering (Step S302). In the generation of a matrix of similarities, for example, event series are regarded as character strings by a uniquely identifiable character being assigned to each event, and thereafter, Levenshtein distances between the event series are calculated and similarities between the event series are found.

In the implemented hierarchical clustering, the common event series extraction unit 141 sets event series having similarities therebetween that are equal to or larger than a preset similarity into the same cluster (Step S303).

The common event series extraction unit 141 then determines whether or not processing of extracting common event series from all of the clusters has been executed (Step S304). If it is determined that the processing of extracting common event series from all of the clusters has been executed (Step S304; Yes), the common event series extraction process by the common event series extraction unit 141 is ended.

On the contrary, if it is determined that the processing of extracting common event series from all of the clusters has not been executed (Step S304; No), the common event series extraction unit 141 specifies a cluster, from which a common event series is to be extracted (Step S305).

The common event series extraction unit 141 extracts the longest common subsequence (LCS) from subsequences common to event series in the same cluster (Step S306). The common event series extraction unit 141 outputs the longest common subsequence that is longer than a predetermined length as a detection purpose event series candidate (Step S307).

As described above, after calculating similarities between event series extracted from malware communication analysis results, the common event series extraction unit 141 executes clustering. Thereafter, from event series having similarities therebetween that are equal to or larger than a certain similarity, the common event series extraction unit 141 extracts any event series confirmed commonly in the respective event series, as a detection purpose event series candidate. When only a single event series is present in the same cluster, if a length of that event series is equal to or longer than a predetermined length, the common event series extraction unit 141 outputs that event series as a detection purpose event series candidate. Further, the common event series extraction unit 141 may arbitrarily set a length of an event series determined to be a detection purpose event series candidate. For example, the common event series extraction unit 141 may set the minimum event series length such that two or more events are included in a series.

Thereby, since the common event series extraction unit 141 is able to determine a common event as an element of a detection purpose event series candidate, even when a subspecies of malware that performs similar operation is generated, if a common characteristic is seen in communications, determination by the detection unit 150 is able to be implemented with the same event series. That is, even under a situation where a subspecies of malware is frequently generated, since the detecting apparatus 100 does not need to prepare many event series to be used in detection, efficiency of detection processing is able to be improved and subspecies of malware are able to be widely dealt with. Further, by using only common event series, the detecting apparatus 100 enables the number of event series to be subjected to collation determination to be reduced and the processing time to be reduced.

(Candidate Determination Process)

Figure 8:
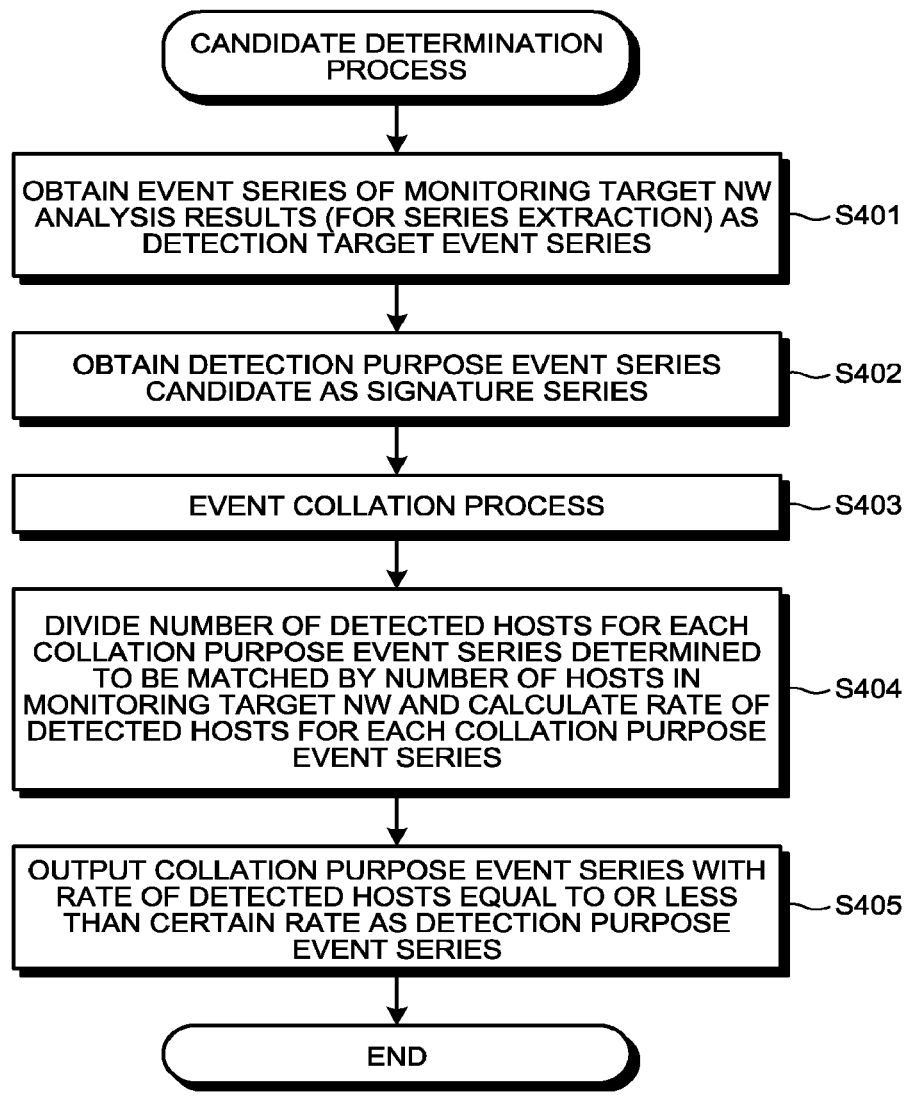
FIG. 8 is a flow chart illustrating a sequence of a candidate determination process by an event collation unit and a candidate determination unit.

Next, by use of FIG. 8, a candidate determination process executed by the event collation unit 142 and the candidate determination unit 143 will be described. FIG. 8 is a flow chart illustrating a sequence of the candidate determination process by the event collation unit 142 and the candidate determination unit 143.

As illustrated in FIG. 8, the event collation unit 142 obtains event series of monitoring target NW analysis results (for series extraction) as detection target event series (Step S401). Further, the event collation unit 142 obtains detection purpose event series candidates extracted by the common event series extraction unit 141 as signature series (Step S402).

The event collation unit 142 then executes an event collation process for the obtained detection target event series and the signature series (Step S403). Since the event collation process by the event collation unit 142 is the same as an event collation process pertaining to the detection unit 150, details thereof will be described later.

Subsequently, the candidate determination unit 143 divides the number of detected hosts for each collation purpose event series determined to be matched by the event collation process, by the number of hosts in the monitoring target NW, and obtains a rate of detected hosts for each collation purpose event series (Step S404). A collation purpose event series is an event series selected from the signature series. That is, the candidate determination unit 143 calculates a rate of detected hosts for each event series included in the signature series. The candidate determination unit 143 then outputs any collation purpose event series, for which the rate of detected hosts is equal to or less than a predetermined rate, as a detection purpose event series (Step S405). Thereby, the candidate determination process executed by the event collation unit 142 and the candidate determination unit 143 is ended.

As described above, based on the number of detected hosts for each detection purpose event series candidate collated by the event collation unit 142, the candidate determination unit 143 outputs the detection purpose event series candidate as a detection purpose event series, if the rate of the number of detected hosts to the total number of hosts in the monitoring target NW is equal to or less than a certain rate. This is, similarly to the processing by the excluded event extraction unit 131, a process for excluding those that may lead to erroneous detection from detection event series in advance, in consideration of the fact that in general, a monitoring target NW has few terminals infected with malware.

That is, if it is assumed that there are few terminals infected with malware in a monitoring target NW, a detection purpose event series candidate determined to be matched in this process is able to be regarded as an event series that is able to be confirmed, not only in communications of malware, but also in general communications, and thus the detection purpose event series candidate may be deemed to be an event series that tends to induce erroneous detection when the detection purpose event series candidate is used in detection. Therefore, by excluding any event series of communications of malware difficult to be distinguished from general communications in advance through the processing by the candidate determination unit 143, erroneous detection by the detection unit 150 is able to be reduced. The detecting apparatus 100 may output, as a detection purpose event series, only any event series, for which a result of division of the number of detected hosts for each collation purpose event series determined to be matched by the event collation process by the number of hosts in the monitoring target NW is "0", that is, only any detection purpose event series candidate, for which any event series of the monitoring target NW analysis result (for series extraction) has not been detected. Thereby, the detecting apparatus 100 is able to prevent those that may cause erroneous detection from being added to detection purpose event series.

(Detection Process)

Figure 9:
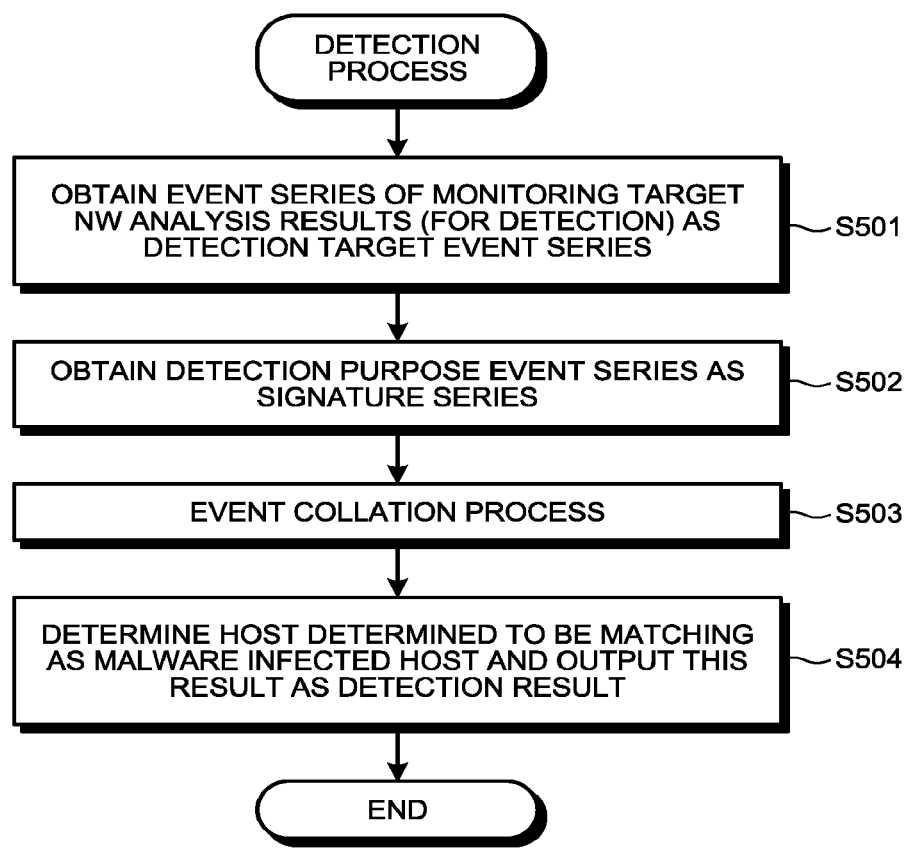
FIG. 9 is a flow chart illustrating a sequence of a detection process by a detection unit.

Next, by use of FIG. 9, a detection process executed by the detection unit 150 will be described. FIG. 9 is a flow chart illustrating a sequence of the detection process by the detection unit 150.

As illustrated in FIG. 9, the event collation unit 151 pertaining to the detection unit 150 obtains event series of monitoring target NW analysis results (for detection) as detection target event series (Step S501). Further, the event collation unit 151 obtains detection purpose event series extracted by the detection purpose series extraction unit 140 as signature series (Step S502). The event collation unit 151 then executes an event collation process for the obtained detection target event series and signature series (Step S503).

Subsequently, the detection result output unit 152 pertaining to the detection unit 150 determines a host determined to be matching by the event collation process as a malware infected host, and outputs a result thereof as a detection result (Step S504). Thereby, the detection process executed by the detection unit 150 is ended.

As described above, the detection unit 150 collates event series of monitoring target NW analysis results (for detection) generated by the series generation unit 130 with detection purpose event series extracted by the detection purpose series extraction unit 140. Thereby, since the detection unit 150 is able to perform collation between event series excluding any event or event time series that is observable in the monitoring target NW, erroneous detection of communications normally occurring in the monitoring target NW is able to be reduced and any malware infected terminal is able to be detected.

(Collation Process)

Figure 10:
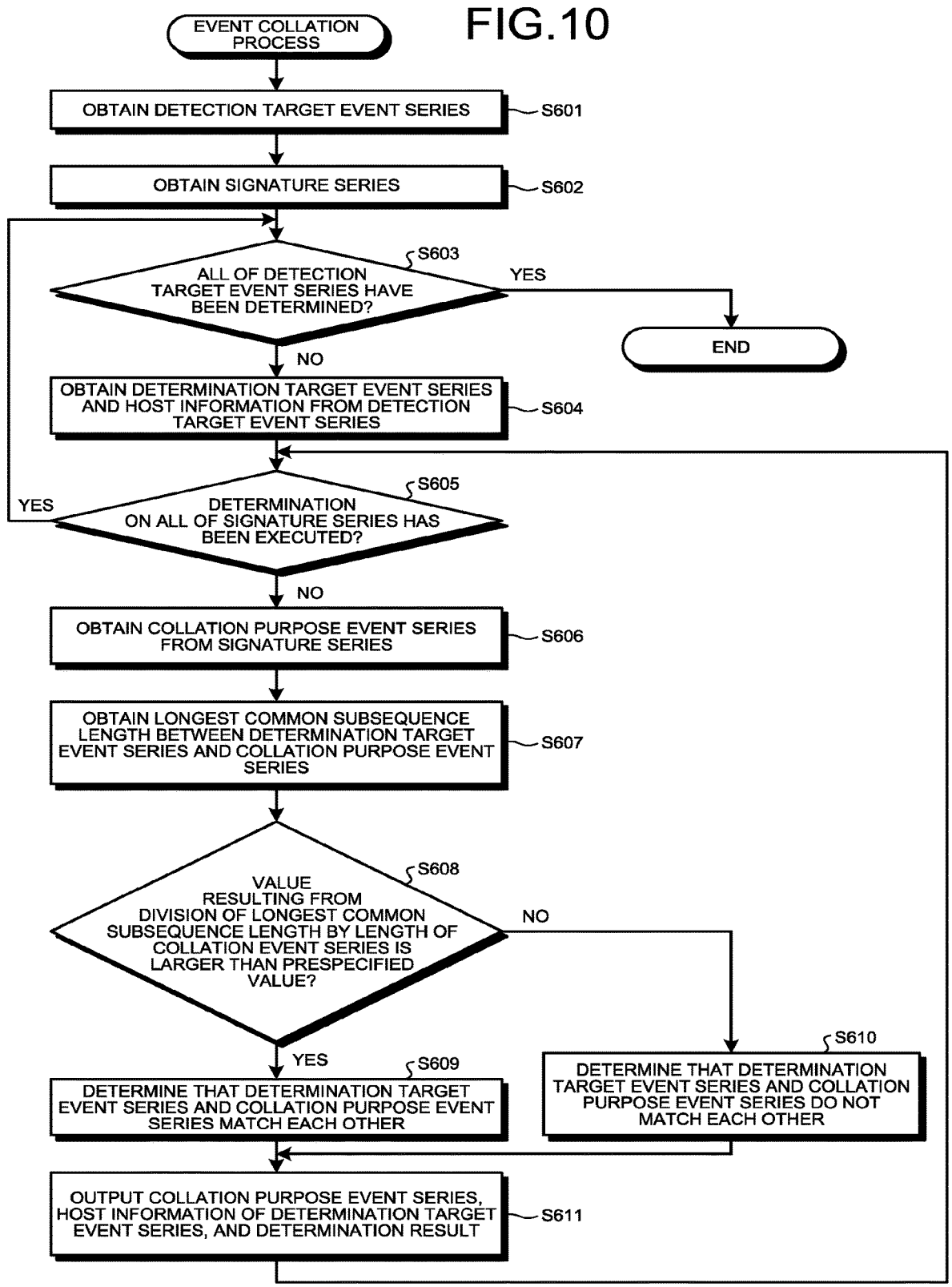
FIG. 10 is a flow chart illustrating a sequence of a collation process by the event collation unit.

Next, by use of FIG. 10, a collation process executed by the event collation unit 151 pertaining to the detection unit 150 will be described. FIG. 10 is a flow chart illustrating a sequence of the collation process by the event collation unit 151. The event collation unit 142 pertaining to the detection purpose series extraction unit 140 also executes processing similar to the processing described below.

As illustrated in FIG. 10, the event collation unit 151 obtains event series of monitoring target NW analysis results (for detection) as detection target event series (Step S601). Further, the event collation unit 151 obtains detection purpose event series extracted by the detection purpose series extraction unit 140 as signature series (Step S602).

The event collation unit 151 then determines whether or not determination on all of the detection target event series has been executed (Step S603). If the determination on all of the detection target event series has been executed (Step S603; Yes), the collation process by the event collation unit 151 is ended.

On the contrary, if the determination on all of the detection target event series has not been performed (Step S603; No), the event collation unit 151 obtains a determination target event series and host information from the detection target event series (Step S604). Based on the obtained host information, for a host to be subjected to detection, the event collation unit 151 determines whether or not determination with all of the signature series has been executed (Step S605). If the determination with all of the signature series has been executed (Step S605; Yes), the event collation unit 151 advances the process to Step S603.

On the contrary, if the determination with all of the signature series has not been performed (Step S605; No), the event collation unit 151 obtains a collation purpose event series from the signature series (Step S606). The event collation unit 151 then obtains a length of the longest common subsequence between the determination target event series and the collation purpose event series (Step S607).

Subsequently, the event collation unit 151 determines whether or not a value resulting from division of the length of the longest common subsequence by a length of the collation purpose event series is larger than a prespecified value (Step S608). If the value is larger than the prespecified value (Step S608; Yes), the event collation unit 151 determines that the determination target event series and the collation purpose event series match each other (Step S609).

On the contrary, if the value is not larger than the prespecified value (Step S608; No), the event collation unit 151 determines that the determination target event series and the collation purpose event series do not match each other (Step S610).

The event collation unit 151 then outputs the collation purpose event series, host information of the determination target event series, and the determination result (Step S611). The event collation unit 151 then advances the process to Step S605.

As described above, the event collation unit 151 executes collation processing for signature series, which are event series extracted based on characteristic communications of malware, with event series to be subjected to detection. Thereby, the detecting apparatus 100 is able to detect any terminal infected with malware having a similar communication pattern with less erroneous detection.

Processing similar to that of the first embodiment may be realized by a detecting system including terminal devices and the detecting apparatus 100, in a monitoring target NW. In this case, predetermined events are generated in the monitoring target NW, and the detecting apparatus 100 obtains events for each of the terminal devices. Further, the malware infected terminal detecting system may include an information processing apparatus that virtually generates communications of malware. In this case, the detecting apparatus 100 included in the detecting system obtains the events generated by the information processing apparatus as malware analysis results.

[Effects of First Embodiment]

As described above, the detecting apparatus 100 according to the first embodiment generates event series formed based on time series in consideration of order of occurrence of events, from events, which are phenomena matching rules characterizing communications, and which are obtained for respective identifiers identifying terminals in a monitoring target NW and pieces of malware, the events being from communications in the monitoring target NW and communications caused by malware. The detecting apparatus 100 calculates similarities between the event series based on the communications caused by malware, sets event series with similarities therebetween that are equal to or larger than a certain similarity into the same cluster, and: when plural event series are present in the same cluster, takes out any event commonly appearing among the event series belonging to the same cluster, and extracts, as a detection purpose event series, an event series, which is a combination of the taken out events in time series order and has a length equal to or longer than a certain length; or when only a single event series is present in the same cluster, extracts that event series as a detection purpose event series if that event series has a length equal to or longer that a certain length. The detecting apparatus 100 then performs event series collation between the generated event series based on the communications in the monitoring target NW and the extracted detection purpose event series, and if it is determined that the event series match each other, it is detected that a malware infected terminal is present in the monitoring target NW.

Thereby, the detecting apparatus 100 according to the first embodiment enables patterns for collation in a monitoring target NW to be reduced, and time taken for the collation to be reduced. Further, instead of treating communications of a single piece of malware as signatures, the detecting apparatus 100 treats a collection of events common to event series clustered based on malware communication analysis results as a detection purpose event series (signatures). Thereby, the detecting apparatus 100 will be able to detect, not only known malware, but also malware of subspecies that perform communications similar to the known malware.

Further, if a value, which is obtained by division of the number of terminals in a monitoring target NW, the terminals being where a predetermined event has been confirmed, the predetermined event being of events obtained for each terminal in a monitoring target NW, by the total number of terminals observable in the monitoring target NW, is larger than a certain value, the detecting apparatus 100 sets that predetermined event as an excluded event, and generates an event series with only the events excluding the excluded event.

Thereby, since the detecting apparatus 100 according to the first embodiment uses detection purpose event series, from which any event or any event time series that is observable in a monitoring target NW has been excluded in advance, erroneous detection of communications that normally occur in the monitoring target NW is able to be reduced.

Further, the detecting apparatus 100 generates an event series from events having event occurrence intervals therebetween that are equal to or less than a certain time period, the events being from events obtained for each of identifiers identifying terminals in a monitoring target NW and pieces of malware.

Thereby, the detecting apparatus 100 according to the first embodiment is able to separate a series of phenomena related to operation of malware and enables accuracy in a detection process to be improved.

Further, the detecting apparatus 100 generates an event series excluding any redundantly appearing event from events obtained for each of identifiers identifying terminals in a monitoring target NW and pieces of malware.

As described, by the detecting apparatus 100 according to the first embodiment generating an event series excluding any redundantly confirmed event, if repeated communications are occurring due to malware execution timing, a command from a C & C server, or the like, the difference in the number of repetitions is able to be absorbed, and thus accuracy in the detection is able to be improved.

Further, the detecting apparatus 100 collates extracted detection purpose event series (detection purpose event series candidates) with event series based on communications in a monitoring target NW (for series extraction) that have been obtained in advance, and if a value resulting from division of the number of terminals corresponding to an event series based on the communications in the monitoring target NW, the event series being determined to be matching in the collation between the event series, by the total number of terminals observable in the monitoring target NW, is equal to or larger than a certain value, the detecting apparatus 100 extracts, as detection purpose event series, event series, from which any detection purpose event series candidate determined to be matched in the collation between the event series has been excluded, from the extracted detection purpose event series candidates.

Thereby, the detecting apparatus 100 according to the first embodiment is able to more accurately generate detection purpose event series that become signatures for detecting malware, and thus enables erroneous detection of malware to be reduced.

Further, if a value, which results from division of the longest partial length (longest common subsequence length) of portions common to an event series (for series extraction) based on communications in a monitoring target NW and a detection purpose event series, by a length of the detection purpose event series, is equal to or larger than a certain value, the detecting apparatus 100 determines that the event series based on the communications in the monitoring target NW matches the detection purpose event series.

Thereby, the detecting apparatus 100 according to the first embodiment is able to appropriately perform collation for matching event series from respective event series to be compared with each other. As a result, the detecting apparatus 100 enables accuracy of event series to be used in detection to be improved, and thus enables erroneous detection of malware to be reduced. Further, in a case where a host in a monitoring target NW is infected with malware, even if events due to the malware and events caused by communications arising from work have been detected in combination, by performing collation using a common subsequence, the detecting apparatus 100 is able to perform detection accurately.

Further, the detecting system according to the first embodiment includes, in a monitoring target NW, the terminal devices and the detecting apparatus 100. The terminal devices generate predetermined communications in the monitoring target NW. From events, which are phenomena matching rules characterizing communications, and which are obtained for each identifier identifying a terminal device or a piece of malware, the events being from the predetermined communications generated by the terminal devices and communications caused by malware, the detecting apparatus 100 generates an event series that is formed in consideration of order of occurrence of the events. Furthermore, for a cluster formed of event series, which are based on communications caused by malware and have event series similarities therebetween equal to or larger than a certain similarity: when plural event series are present in the same cluster, the detecting apparatus 100 takes out any event that appears commonly to the event series belonging to the same cluster, and extracts, as a detection purpose event series, an event series, which is a combination of the taken out events in time series order and has a length equal to or longer than a certain length; or when only a single event series is present in the same cluster, the detecting apparatus 100 extracts that event series as a detection purpose event series if that event series has a length equal to or longer that a certain length. Moreover, if it is determined that an event series based on communications of a terminal device matches an extracted detection purpose event series, the detecting apparatus 100 detects that a malware infected terminal is present in the monitoring target NW.

Thereby, the detecting system according to the first embodiment enables signatures that become patterns for collation in a monitoring target NW to be reduced, time taken for the collation to be reduced, and malware of subspecies that perform communications similar to those of known malware to be detected.

Second Embodiment

In the above description of the first embodiment, the case where event series, which are each formed in consideration of order of occurrence of events, are generated, and detection purpose event series are extracted from the event series has been described, but the present invention is not limited to this case, and event groups that are each formed of a combination of non-redundant events may be generated, and detection purpose event groups may be extracted from the event groups. Thus, in a second embodiment below, a case where event groups, which are each formed of a combination of non-redundant events, are generated, and detection purpose event groups are extracted from the event groups will be described. In the following embodiment, a configuration of a detecting apparatus according to a second embodiment and flows of processing by the detecting apparatus according to the second embodiment, will be described in order, and lastly, effects according to the second embodiment will be described.

[Outline of Second Embodiment]

Figure 11:
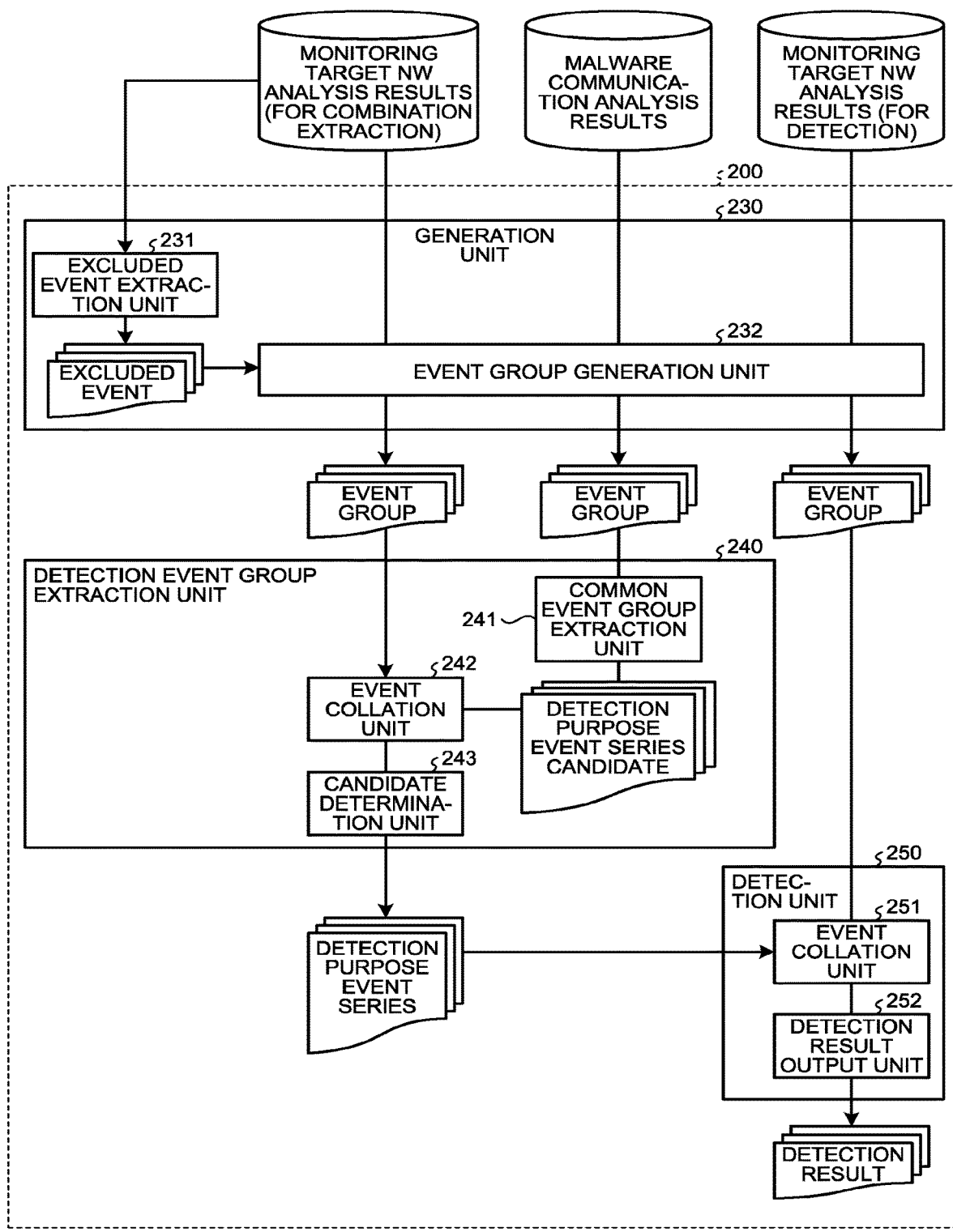
FIG. 11 is a block diagram illustrating an outline of a detecting apparatus according to a second embodiment.

Firstly, by use of FIG. 11, an outline of processing executed by a detecting apparatus 200, which is a malware infected terminal detecting apparatus, will be described. FIG. 11 is a block diagram illustrating an outline of the detecting apparatus 200 according to the second embodiment. As illustrated in FIG. 11, the processing by the detecting apparatus 200 is executed by a generation unit 230, a detection event group extraction unit 240, and a detection unit 250, which the detecting apparatus 200 has. The detecting apparatus 200 detects any terminal (host) infected with malware in a monitoring target NW, by: generating detection purpose event groups from monitoring target network (NW) analysis results (for combination extraction), which have been collected in advance before detecting, and malware communication analysis results; and collating event groups generated from monitoring target NW analysis results (for detection) with the detection purpose event groups.

The monitoring target NW analysis results (for combination extraction and for detection) store therein data having fields for: identifiers identifying hosts in the monitoring target NW; events; and event occurrence times. An event means a phenomenon capturing each of certain characteristics when the certain characteristics are able to be confirmed in communications. For example, an event is: a phenomenon where a communication with a particular communication destination is included as a result of analysis of a device log recorded in a firewall, a Web proxy, or the like; a phenomenon where a certain number of communications or more have been performed in a predetermined time period; or a phenomenon where malicious data transmission has been detected by an intrusion detection system (IDS). That is, an event is a phenomenon that matches a rule enabling the phenomenon to be characterized as a communication that is highly probable to be a malicious communication, the communication being from communications in a monitoring target NW. For example, a predetermined external device performs analysis of whether or not any event matches a rule characterizing communications, and the detecting apparatus 200 obtains, as a monitoring target NW analysis result, any event determined to match the rule. A malware communication analysis result is a result of analysis of communication data upon actual operation of malware, from a viewpoint similar to that for when the above described monitoring target NW analysis result is obtained. Further, an event group is monitoring target NW analysis results that have been grouped together for each host in a monitoring target NW, or malware communication analysis results that have been grouped together for each piece of malware to be analyzed.

As described above, events detected for each of identifiers of hosts in a monitoring target NW are stored in association with types of the events, and event occurrence times. For example, FIG. 2 illustrates an example where at a host identified by "192.168.10.11", an event, "detection of communication with particular communication destination", occurred at "twenty minutes and twelve seconds past twelve, on Oct. 15, 2014". Further, as illustrated in FIG. 3, similarly to monitoring target NW analysis results, events detected for each malware identifier are stored in association with types of the events, and event occurrence times.

Hereinafter, processing executed by the detecting apparatus 200 will be described along a flow thereof. The generation unit 230 pertaining to the detecting apparatus 200 includes an excluded event extraction unit 231 and an event group generation unit 232, has monitoring target NW analysis results and malware communication analysis results as inputs, and generates event groups for each of the monitoring target NW analysis results and the malware communication analysis results.

Specifically, when monitoring target NW analysis results (for combination extraction) are input, the excluded event extraction unit 231 sets, as an excluded event, any event in the analysis results, the event having been confirmed in many hosts in a monitoring target NW, the many hosts being as many as a predetermined rate or more.

The event group generation unit 232 generates event groups, each of which is formed of events that are not excluded events, from monitoring target NW analysis results and malware communication analysis results. In general, since there are few infected terminals in a monitoring target NW, any event confirmed in many hosts is able to be determined as not capturing a characteristic of communications by malware. Thus, by excluding any excluded event, the event group generation unit 232 is able to generate an event group without any event confirmed in terminals not infected with malware. That is, the event group generation unit 232 enables reduction of erroneous detection in detection of any infected terminal.

Further, the event group generation unit 232 generates one event group from events with event occurrence intervals therebetween that are equal to or less than a certain time period, from events of the same host or same piece of malware. That is, the event group generation unit 232 generates an event group by separating a series of phenomena related to operation of malware. Furthermore, the event group generation unit 232 generates an event group by excluding any redundant event from events of the same host or same piece of malware. Thereby, the event group generation unit 232 is able to generate an event group absorbing a difference in the number of repetitions, even if repetitive communications are occurring due to a malware execution timing or a command from a command and control (C & C) server. That is, the event group generation unit 232 enables accuracy of a later described detection process to be improved.

Next, processing by the detection event group extraction unit 240 pertaining to the detecting apparatus 200 will be described. The detection event group extraction unit 240 includes a common event group extraction unit 241, an event collation unit 242, and a candidate determination unit 243, and extracts, based on event groups generated by the generation unit 230, detection purpose event groups.

Specifically, after calculating similarities between event groups extracted from malware communication analysis results, the common event group extraction unit 241 executes clustering. Thereafter, from event groups having similarities therebetween that are equal to or larger than a certain similarity, the common event group extraction unit 241 extracts any event confirmed commonly in the respective event groups, as a detection purpose event group candidate.

The event collation unit 242 collates event groups of monitoring target NW analysis results (for combination extraction) with detection purpose event group candidates, and calculates to what extent each detection purpose event group candidate enables hosts in a monitoring target NW to be detected.

Based on the number of detected hosts for each detection purpose event group candidate calculated by the event collation unit 242, the candidate determination unit 243 outputs the detection purpose event group candidate as a detection purpose event group, if a rate of the number of detected hosts to the total number of hosts in the monitoring target NW is equal to or less than a certain rate.

Next, processing by the detection unit 250 pertaining to the detecting apparatus 200 will be described. The detection unit 250 includes an event collation unit 251 and a detection result output unit 252, and detects any malware infected terminal in a monitoring target NW.

Specifically, similarly to the event collation unit 242 of the detection event group extraction unit 240, the event collation unit 251 performs collation of whether an event group generated from monitoring target NW analysis results (for detection) matches a detection purpose event group.

The detection result output unit 252 outputs host information that has been determined to match the detection purpose event group as a result of the collation by the event collation unit 251. The host information is, for example, the Internet Protocol (IP) address of the terminal in the monitoring target NW.

As described above, the detecting apparatus 200 generates a detection purpose event group from monitoring target NW analysis results (for combination extraction) and malware communication analysis results, and collates an event group generated from monitoring target NW analysis results (for detection) with the detection purpose event group, to thereby detect any terminal infected with malware in a monitoring target NW.

As described above, the detecting apparatus 200 according to the second embodiment performs detection of any infected terminal by using only detection purpose event groups, each of which is a combination pattern of common characteristics characterizing malware, from communications of plural pieces of malware. Therefore, the detecting apparatus 200 enables patterns for collation in a monitoring target NW to be reduced, and time taken for the collation to be reduced. Further, since the detecting apparatus 200 uses, in processing, detection purpose event groups, from which any event or any combination of events that is observable in a monitoring target NW has been excluded in advance, erroneous detection of communications that normally occur in the monitoring target NW is able to be reduced.

In generating a detection purpose event group, the detecting apparatus 200 may use only malware communication analysis results, without using monitoring target NW analysis results (for combination extraction). Further, details of the processing pertaining to the detecting apparatus 200 will be described later by use of flow charts.

[Configuration of Detecting Apparatus According to Second Embodiment]

Figure 12:
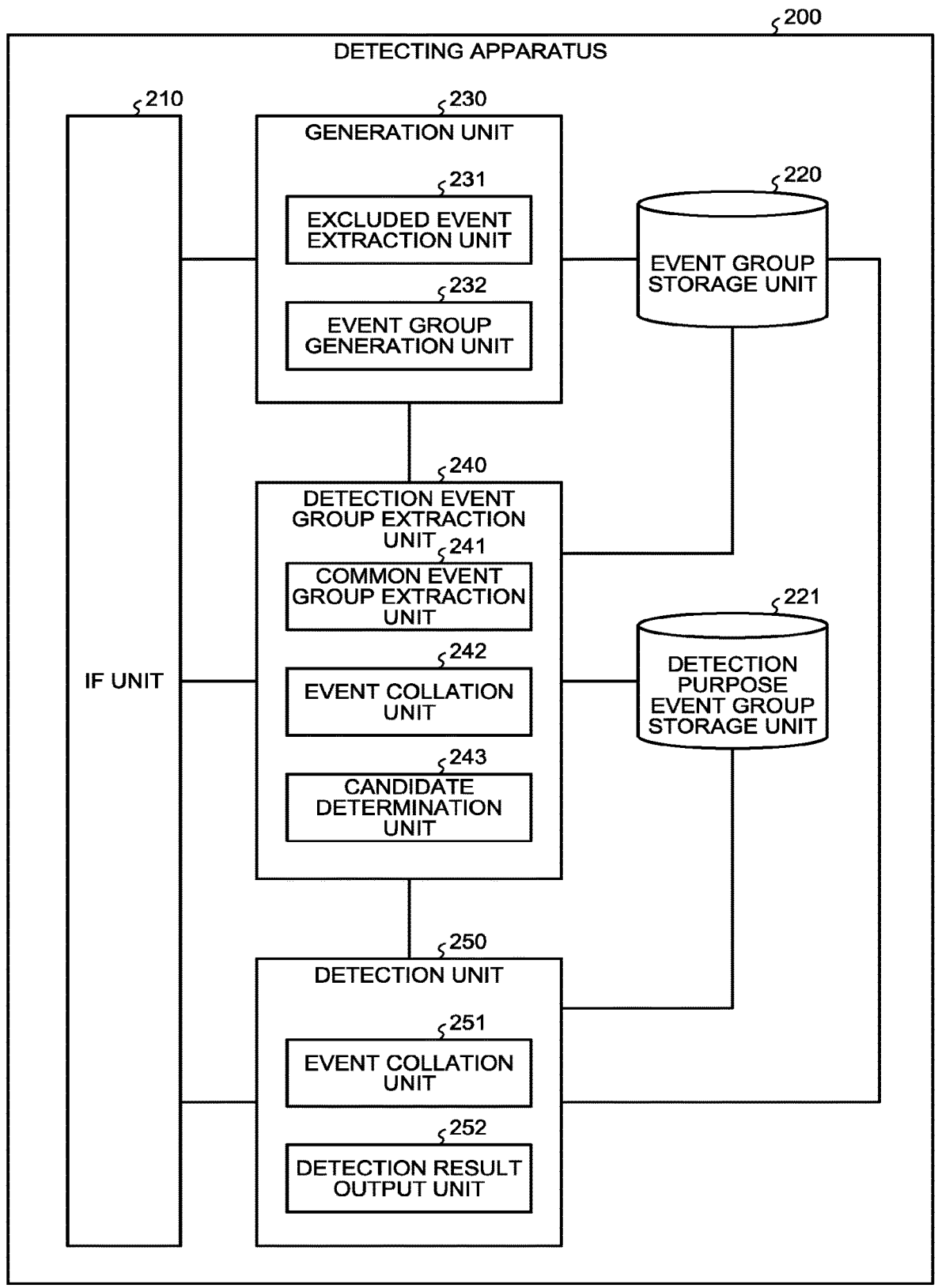
FIG. 12 is a diagram illustrating an example of a configuration of the detecting apparatus according to the second embodiment.

Next, by use of FIG. 12, the detecting apparatus 200 according to the second embodiment will be described. FIG. 12 is a diagram illustrating an example of a configuration of the detecting apparatus 200 according to the second embodiment.

As exemplified by FIG. 12, the detecting apparatus 200 according to the second embodiment has an interface (IF) unit 210, an event group storage unit 220, a detection purpose event group storage unit 221, the generation unit 230, the detection event group extraction unit 240, and the detection unit 250.

The IF unit 210 is, for example, a network interface card (NIC), and transmits and receives various data to and from an external device. For example, the IF unit 210 receives, as monitoring target NW analysis results, results of analysis of device logs and the like of any firewalls and Web proxies installed in a monitoring target NW.

The event group storage unit 220 and the detection purpose event group storage unit 221 are each realized by, for example: a semiconductor memory element, such as a random access memory (RAM) or a flash memory; or a hard disk, an optical disk, or the like. The event group storage unit 220 and the detection purpose event group storage unit 221 store therein, as appropriate, information handled by the generation unit 230, the detection event group extraction unit 240, and the detection unit 250.

For example, the event group storage unit 220 stores therein event groups generated by the generation unit 230. Further, the detection purpose event group storage unit 221 stores therein detection purpose event groups extracted by the detection event group extraction unit 240. The detecting apparatus 200 does not necessarily have the event group storage unit 220 or the detection purpose event group storage unit 221 as a component thereof. For example, the detecting apparatus 200 may use an external storage device that executes processing that is similar to that of the event group storage unit 220 or the detection purpose event group storage unit 221.

The generation unit 230, the detection event group extraction unit 240, and the detection unit 250 are realized by, for example, an integrated circuit, such as an application specific integrated circuit (ASIC), or a field programmable gate array (FPGA). Further, the generation unit 230, the detection event group extraction unit 240, and the detection unit 250 are realized by, for example, a program stored in a storage device not illustrated, the program being executed by a central processing unit (CPU), a micro processing unit (MPU), or the like, with a RAM being a work area.

The generation unit 230 includes the excluded event extraction unit 231 and the event group generation unit 232, has monitoring target NW analysis results and malware communication analysis results as inputs, and generates event groups for each of the monitoring target NW analysis results and the malware communication analysis results. When monitoring target NW analysis results (for combination extraction) are input, the excluded event extraction unit 231 sets, as an excluded event, any event in the analysis results, the event having been confirmed in many hosts in a monitoring target NW, the many hosts being as many as a predetermined rate or more. Specifically, the excluded event extraction unit 231 obtains the total number of hosts in the monitoring target NW included in the input monitoring target NW analysis results (for combination extraction), and the number of hosts including a predetermined event. Subsequently, the excluded event extraction unit 231 sets the predetermined event as an excluded event, if, based on a rate of the number of hosts including the predetermined event, to the total number of hosts, the hosts including the predetermined event exceed a certain rate. Thereby, the excluded event extraction unit 231 enables an event group to be generated, just with events excluding general processes executed in many hosts.

Further, the event group generation unit 232 generates event groups, each of which is formed of analysis results not corresponding to excluded events, from monitoring target NW analysis results and malware communication analysis results. Specifically, the event group generation unit 232 obtains, as an input, an event that is not an excluded event, from the monitoring target NW analysis results or the malware communication analysis results. Upon the obtainment, the event group generation unit 232 records an event occurrence time of the read event. The event group generation unit 232 then determines whether the recorded event occurrence time is away from the most recent previously read event occurrence time by a certain time period or more. If the event occurrence time is not away from the most recent previous event time by the certain time period or more, the event group generation unit 232 presumes that the event is an element of the same event group as the preceding event, and generates the events that have been subjected to the determination as the event group. As described above, since the event group generation unit 232 generates an event group with events excluding general processes, the event group generation unit 232 enables reduction of erroneous detection in detection of any infected terminal.

The detection event group extraction unit 240 includes the common event group extraction unit 241, the event collation unit 242, and the candidate determination unit 243, and extracts, based on event groups generated by the generation unit 230, detection purpose event groups.

The common event group extraction unit 241 extracts detection purpose event group candidates from event groups generated by the generation unit 230. Specifically, the common event group extraction unit 241 performs clustering after calculating similarities between event groups extracted from malware communication analysis results, and extracts, from event groups having similarities therebetween that are equal to or larger than a certain similarity, any event confirmed commonly to the respective event groups. If the number of types of events that have been able to be confirmed commonly is larger than a predetermined number, the common event group extraction unit 241 then regards the collection of the extracted events as a detection purpose event group candidate. For example, if there are two or more types of events that are able to be confirmed commonly, the common event group extraction unit 241 outputs the collection of extracted events as a detection purpose event group candidate. Further, in a case where only a single event group is present in the same cluster, the common event group extraction unit 241 may extract that event group directly as a detection purpose event group candidate, if the number of types of events included in the event group is equal to or larger than a certain number (for example, there are two or more types). As described above, by clustering event groups and determining any common event as an element of a detection purpose event group candidate, the common event group extraction unit 241 enables determination by the detection unit 250 to be implemented with the same event group when characteristics common to communications are seen, even in a case where a subspecies of malware that performs similar operation is generated. That is, even under a situation where a subspecies of malware is frequently generated, since the common event group extraction unit 241 does not need to prepare many event groups to be used in detection, efficiency of a detection process is able to be improved, and subspecies of malware are able to be widely dealt with. Furthermore, by using only common event groups, the detecting apparatus 200 enables reduction in the number of event groups to be subjected to collation and reduction in the processing time.

The event collation unit 242 collates event groups of monitoring target NW analysis results (for combination extraction) with detection purpose event group candidates, and calculates to what extent each detection purpose event group candidate enables hosts in a monitoring target NW to be detected. Specifically, the event collation unit 242 obtains, as inputs, event groups of monitoring target NW analysis results (for combination extraction) generated by the generation unit 230, and a detection purpose event group candidate extracted by the common event group extraction unit 241. The event collation unit 242 then collates these event groups with each other, and calculates the number of hosts corresponding to the monitoring target NW analysis results (for combination extraction) determined to be matching. The event collation unit 242 then outputs the calculated number of hosts as an output to the candidate determination unit 243.

Based on the number of detected hosts for each detection purpose event group candidate calculated by the event collation unit 242, the candidate determination unit 243 outputs the detection purpose event group candidate as a detection purpose event group, if a rate of the number of detected hosts to the total number of hosts in the monitoring target NW is equal to or less than a certain rate. Specifically, the candidate determination unit 243 divides the number of detected hosts for the detection purpose event group candidate determined to be matched by event groups by the event collation unit 242, by the total number of hosts in the monitoring target NW, to thereby calculate a rate of the detected hosts for each event group. The candidate determination unit 243 then outputs, as a detection purpose event group, any event group, for which the rate of detected hosts is equal to or less than the certain rate, from the detection purpose event group candidates. Thereby, similarly to the processing by the excluded event extraction unit 231, the candidate determination unit 243 is able to exclude those that may lead to erroneous detection from detection event groups in advance, in consideration of the fact that in general, a monitoring target NW has few terminals infected with malware. Thus, the processing by the candidate determination unit 243 enables reduction of erroneous detection in detection of any infected terminal in a monitoring target NW.

The detection unit 250 includes the event collation unit 251 and the detection result output unit 252, and detects any malware infected terminal in a monitoring target NW. The event collation unit 251 performs collation of whether event groups from monitoring target NW analysis results (for detection) and detection purpose event groups match each other. Specifically, the event collation unit 251 calculates the number of events that are commonly confirmed in event groups from input monitoring target NW analysis results (for detection) and detection purpose event groups. The event collation unit 251 then determines, based on the number of events that are commonly confirmed in the event groups to be processed, whether or not the event groups subjected to the determination match each other. The detection result output unit 252 then outputs host information that has been determined to match the detection purpose event group as a result of the collation by the event collation unit 251. In other words, the detection result output unit 252 detects a malware infected terminal, by outputting, with respect to a host determined to match a detection purpose event group that is a signature, information enabling the host to be identified, the host being determined to match the detection purpose event group, as a host highly likely to be a malware infected terminal.

[Sequence of Processing of Second Embodiment]

Next, sequences of detecting processing by the above described detecting apparatus 200 will be described in detail.

(Excluded Event Extraction Process)

Figure 13:
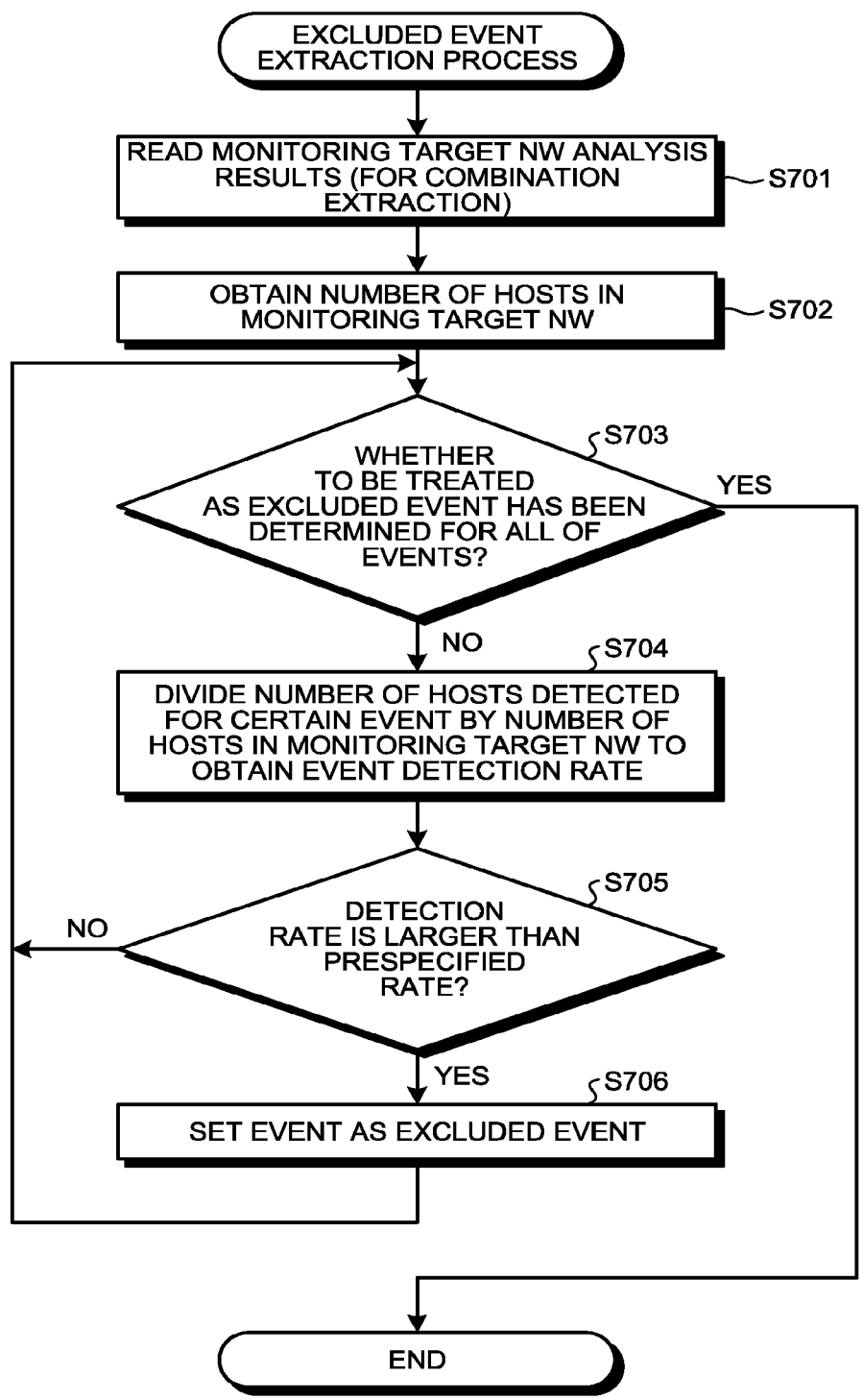
FIG. 13 is a flow chart illustrating a sequence of an excluded event extraction process by an excluded event extraction unit.

Firstly, by use of FIG. 13, an excluded event extraction process executed by the excluded event extraction unit 231 will be described. FIG. 13 is a flow chart illustrating a sequence of the excluded event extraction process by the excluded event extraction unit 231 according to the second embodiment.

As illustrated in FIG. 13, the excluded event extraction unit 231 reads monitoring target NW analysis results (for combination extraction) as inputs (Step S701). The excluded event extraction unit 231 then obtains the number of hosts in a monitoring target NW (Step S702). The number of hosts in the monitoring target NW may be the number of hosts present in the monitoring target NW if the number is known in advance, or the number of hosts appearing in the monitoring target NW analysis results (for combination extraction) may be regarded as the number of hosts in the monitoring target NW. In other words, the number of hosts in the monitoring target NW is the total number of hosts that are observable in the monitoring target NW, and if the total number of hosts that are present therein has been observed in advance, that total number of hosts is used, and if the total number of hosts is unknown, the total number of observable hosts is used from the monitoring target NW analysis results (for combination extraction).

Subsequently, the excluded event extraction unit 231 determines whether or not processing, in which whether an event is to be made an excluded event is determined, has been executed for all of events included in the read monitoring target NW analysis results (for combination extraction) (Step S703). If it is determined that the processing has been executed for all of the events, the excluded event extraction process is ended (Step S703; Yes).

On the contrary, if it is determined that the processing has not been executed for all of the events (Step S703; No), the excluded event extraction unit 231 continues the excluded event extraction process. The excluded event extraction unit 231 then divides the number of hosts detected for a certain event, by the number of hosts in the monitoring target NW to thereby obtain a detection rate of the event (Step S704).

The excluded event extraction unit 231 then determines whether or not the detection rate is larger than a prespecified value (Step S705). If the excluded event extraction unit 231 determines that the detection rate is larger than the prespecified value (Step S705; Yes), the excluded event extraction unit 231 sets the event being subjected to the determination as an excluded event (Step S706). On the contrary, if the excluded event extraction unit 231 determines that the detection rate is not larger than the prespecified value (Step S705; No), without setting that event as an excluded event, the excluded event extraction unit 231 continues processing for a different event (proceeding to Step S703).

As described above, the excluded event extraction unit 231 determines that any event confirmed in many hosts is not an event capturing only a characteristic of communications by malware, extracts that event, and sets the event as an excluded event. Thereby, the excluded event extraction unit 231 enables erroneous detection in detecting processing for any infected terminal to be reduced.

(Event Group Generation Process)

Figure 14:
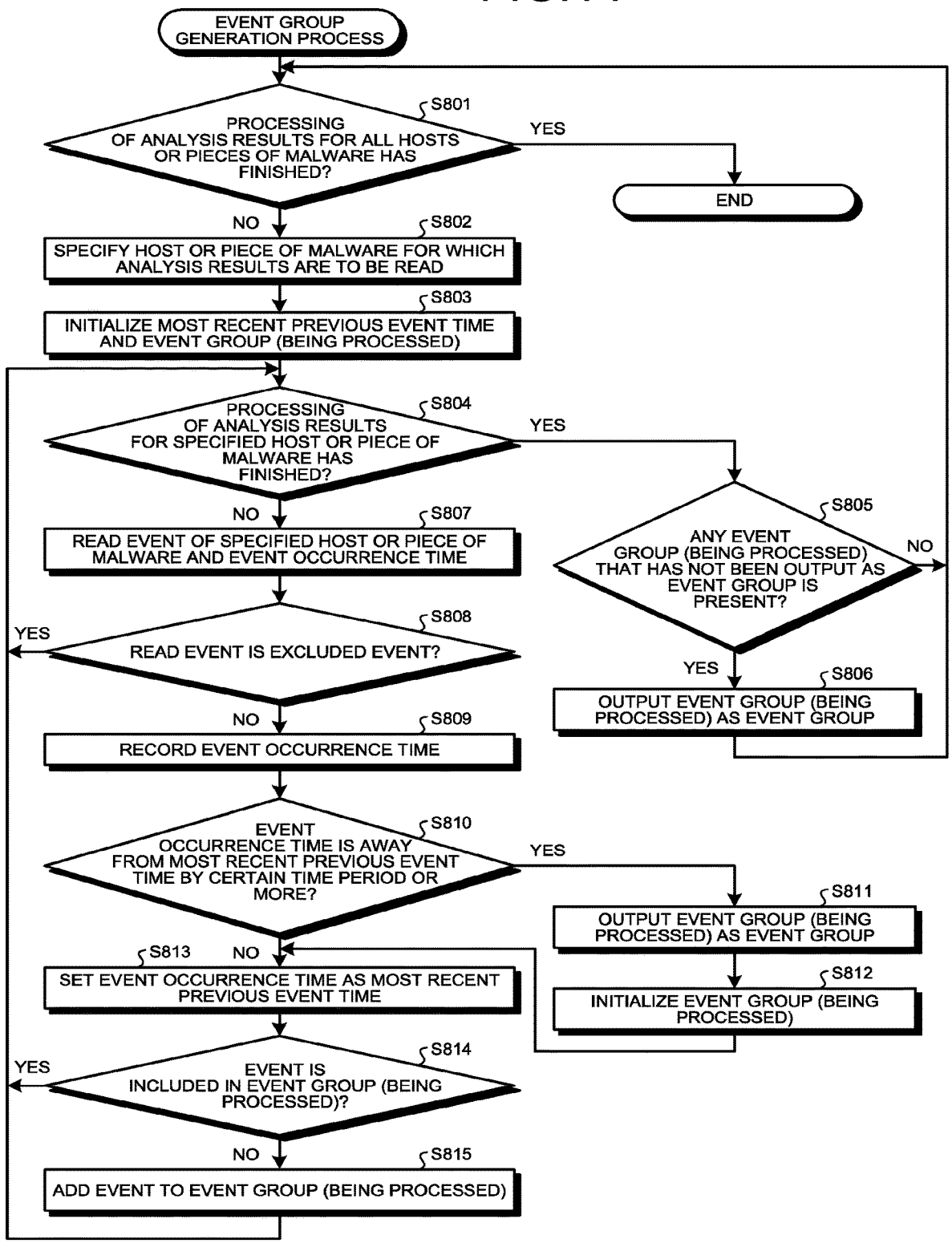
FIG. 14 is a flow chart illustrating a sequence of an event group generation process by an event group generation unit.

Next, by use of FIG. 14, an event group generation process executed by the event group generation unit 232 will be described. FIG. 14 is a flow chart illustrating a sequence of the event group generation process by the event group generation unit 232.

As illustrated in FIG. 14, the event group generation unit 232 determines whether or not analysis results for all of hosts or pieces of malware have been processed, with respect to an event group generation process for monitoring target NW analysis results (for combination extraction and for detection) and malware communication analysis results (Step S801). If it is determined that the processing has been executed for all of them, the event group extraction process is ended (Step S801; Yes).

On the contrary, if it is determined that the analysis results for all of the hosts or pieces of malware have not been processed (Step S801; No), the event group generation unit 232 specifies a host or a piece of malware, for which the analysis results are to be read (Step S802). When extracting an event group from the monitoring target NW analysis results, the event group generation unit 232 performs generation of an event group for each host in the monitoring target NW. For identification of a host, for example, an IP address of the host is used. Further, when generating an event group from malware communication analysis results, the event group generation unit 232 performs generation of an event group for each piece of malware. For identification of a piece of malware, for example, a hash value of the piece of malware is used. Both the monitoring target NW analysis results and the malware communication analysis results are sorted by times at which the events were confirmed.

Before the processing described below, the event group generation unit 232 initializes the most recent previous event time and the event group (being processed) (Step S803).

Firstly, the event group generation unit 232 determines whether or not processing of analysis results for a specified host or piece of malware has finished (Step S804). If it is determined that the processing for the analysis results has finished (Step S804; Yes), the event group generation unit 232 determines whether or not any event group that has not been output as an event group (that is, any event group being subjected to generation processing) is present (Step S805). If any event group that has not been output as an event group is present (Step S805; Yes), the event group generation unit 232 outputs the event group being processed, as an event group (Step S806).

On the contrary, if an event group being processed that has not been output as an event group is not present (Step S805; No), the event group generation unit 232 advances the process to Step S801.

At Step S804, if it is determined that the processing of the analysis results has not finished (Step S804; No), the event group generation unit 232 reads an event of the specified host or piece of malware, and an event occurrence time thereof (Step S807). The event group generation unit 232 then determines whether or not the read event corresponds to an excluded event (Step S808). If the event corresponds to an excluded event (Step S808; Yes), the event group generation unit 232 advances the process to Step S804 without adding the read event to the event group.

On the contrary, if the read event does not correspond to an excluded event (Step S808; No), the event group generation unit 232 records the event occurrence time of the read event (Step S809). The event group generation unit 232 then determines whether the recorded event occurrence time is away from the most recent previous event time by a certain time period or more.

If the event occurrence time is away from the most recent previous event time by the certain time period or more (Step S810; Yes), the read event will be added to an event group that is different from the event group being processed, and thus the event group generation unit 232 outputs the event group being processed as an event group (Step S811). In this case, the event group generation unit 232 initializes the event group (being processed) that has been output (Step S812).

At Step S810, if the event occurrence time is not away from the most recent previous event time by the certain time period or more (Step S810; No), the event group generation unit 232 sets the event occurrence time of the read event as the most recent previous event time (Step S813). In other words, if the event occurrence time is not away from the most recent previous event time by the certain time period or more, the event group generation unit 232 presumes that the event is an element of the same event group as the preceding event, and determines whether to add the event to the event group (being processed) (later described Step S814).

The event group generation unit 232 then determines whether or not the read event is included in the event group (being processed) (Step S814). If the read event is included in the event group (being processed) (Step S814; Yes), since the event group generation unit 232 does not add any redundant event to the event group (being processed), the process is advanced to Step S804.

On the contrary, if the read event is not included in the event group (being processed) (Step S814; No), the event group generation unit 232 adds that event to the event group (being processed) (Step S815). Thereafter, the event group generation unit 232 advances the process to Step S804.

As described above, if a read event is an excluded event, the event group generation unit 232 does not incorporate that event into an event group. Further, the event group generation unit 232 records the time, at which the event occurred, compares the time, at which the event occurred, with the time, at which a preceding event occurred, and determines whether these events are away from each other by a certain time period or more. Thereby, the event group generation unit 232 generates event groups, such that each event group is formed of events with short event occurrence intervals. Furthermore, the event group generation unit 232 determines whether an event being subjected to processing is included in the event group (being processed), and if the event is included in the event group, the event group generation unit 232 does not add that event to the event group. That is, no redundant events are present in the generated event group. Moreover, the event group generation unit 232 outputs an event group only when the number of events included in the event group is equal to or larger than a certain number.

(Common Event Group Extraction Process)

Figure 15:
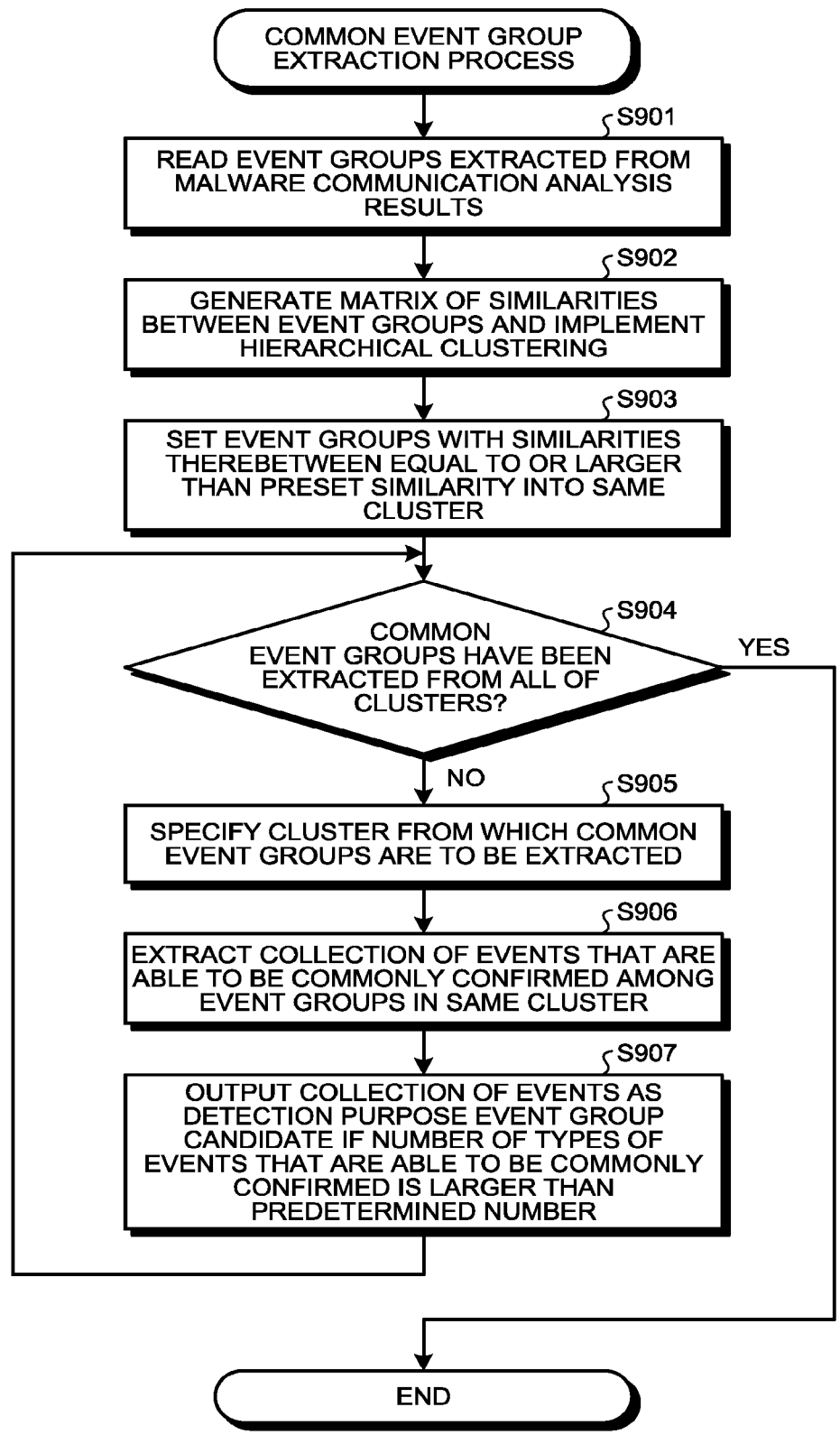
FIG. 15 is a flow chart illustrating a sequence of a common event group extraction process by a common event group extraction unit.

Next, by use of FIG. 15, a common event group extraction process executed by the common event group extraction unit 241 will be described. FIG. 15 is a flow chart illustrating a sequence of the common event group extraction process by the common event group extraction unit 241.

As illustrated in FIG. 15, the common event group extraction unit 241 reads event groups extracted from malware communication analysis results as targets to be processed (Step S901). The common event group extraction unit 241 then generates a matrix of similarities between the event groups, and implements hierarchical clustering (Step S902). In the generation of the matrix of similarities, for example, the similarities are calculated based on Jaccard coefficients between the event groups.

In the implemented hierarchical clustering, the common event group extraction unit 241 sets event groups having a similarity therebetween equal to or larger than a preset similarity into the same cluster (Step S903).

The common event group extraction unit 241 determines whether or not processing of extracting common event groups from all of the clusters has been executed (Step S904). If it is determined that the processing of extracting common event series from all of the clusters has been executed (Step S904; Yes), the common event group extraction process by the common event group extraction unit 241 is ended.

On the contrary, if it is determined that the processing of extracting common event groups from all of the clusters has not been executed (Step S904; No), the common event group extraction unit 241 specifies a cluster, from which a common event group is to be extracted (Step S905).

The common event group extraction unit 241 then extracts any collection of events that are able to be commonly confirmed among event groups in the same cluster (Step S906). If the number of types of the events that are able to be confirmed commonly is larger than a predetermined number, the common event group extraction unit 241 then outputs the collection of the events as a detection purpose event group candidate (Step S907). For example, if there are two or more types of events that are able to be confirmed commonly, the common event group extraction unit 241 may output a collection of these events as a detection purpose event group candidate. Further, when event groups with similarities therebetween that are equal to or larger than a certain similarity are set into the same cluster; if only a single event group is present in the same cluster and the number of types of events included in that event group is equal to or larger than a certain number, the common event group extraction unit 241 may extract that event group as a detection purpose event group.

As described above, after calculating similarities between event groups extracted from malware communication analysis results, the common event group extraction unit 241 executes clustering. Thereafter, from event groups having similarities therebetween that are equal to or larger than a certain similarity, the common event group extraction unit 241 extracts any event confirmed commonly in the respective event groups, as a detection purpose event group candidate. Thereby, since the common event group extraction unit 241 is able to regard a common event as an element of a detection purpose event group candidate, even when a subspecies of malware that performs similar operation is generated, if a common characteristic is seen in communications, determination by the detection unit 250 is able to be implemented with the same event group. That is, even under a situation where a subspecies of malware is frequently generated, since there is no need for preparation of many event groups to be used in detection, the detecting apparatus 200 enables efficiency of a detection process to be improved and subspecies of malware to be widely dealt with. Further, by using only common event groups, the detecting apparatus 200 enables the number of event groups to be subjected to collation determination to be reduced and the processing time to be reduced.

(Candidate Determination Process)

Figure 16:
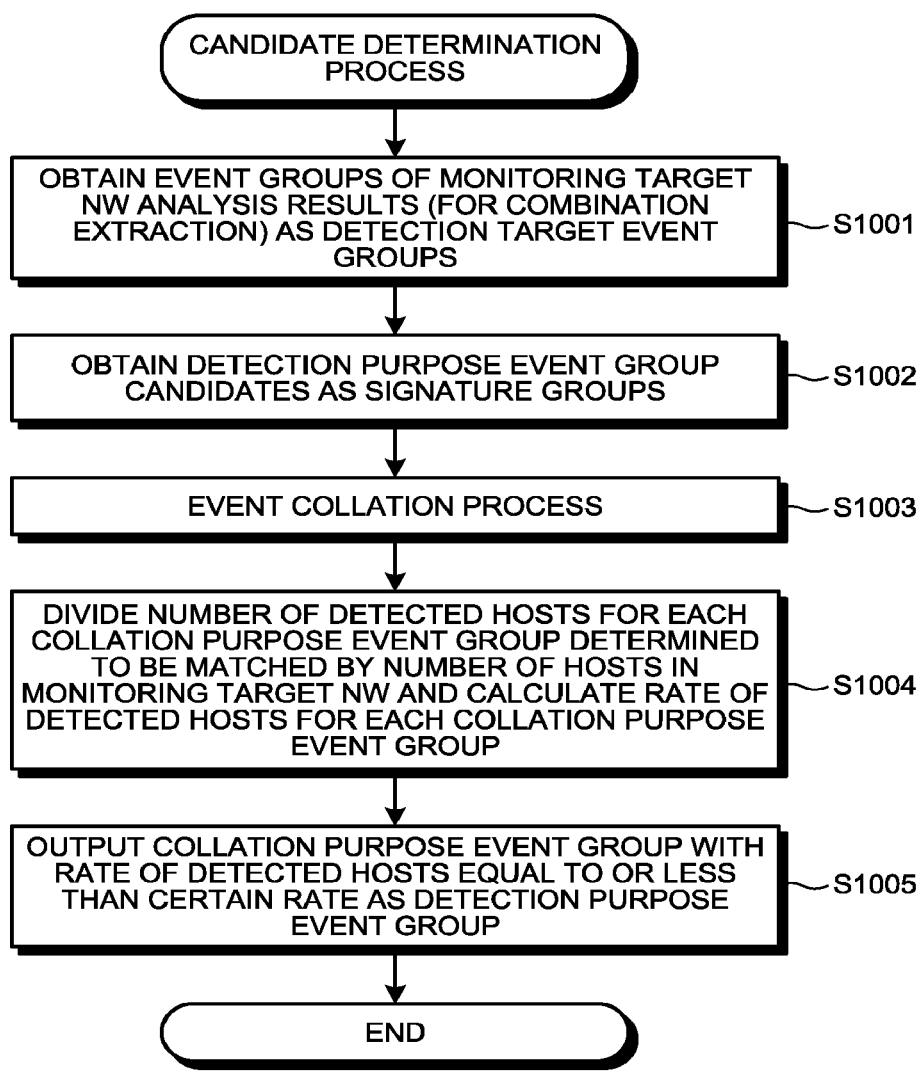
FIG. 16 is a flow chart illustrating a sequence of a candidate determination process by an event collation unit and a candidate determination unit.

Next, by use of FIG. 16, a candidate determination process executed by the event collation unit 242 and the candidate determination unit 243 will be described. FIG. 16 is a flow chart illustrating a sequence of the candidate determination process by the event collation unit 242 and the candidate determination unit 243.

As illustrated in FIG. 16, the event collation unit 242 obtains event groups of monitoring target NW analysis results (for combination extraction) as detection target event groups (Step S1001). Further, the event collation unit 242 obtains detection purpose event group candidates extracted by the common event group extraction unit 241, as signature groups (Step S1002).

The event collation unit 242 then executes an event collation process for the obtained detection target event groups and the signature groups (Step S1003). Since the event collation process by the event collation unit 242 is similar to an event collation process according to the detection unit 250, details thereof will be described later.

Subsequently, the candidate determination unit 243 divides the number of detected hosts for each collation purpose event group determined to be matched by the event collation process, by the number of hosts in the monitoring target NW, and obtains a rate of detected hosts for each collation purpose event group (Step S1004). The collation purpose event group is an event group selected from the signature groups. That is, the candidate determination unit 243 calculates a rate of detected hosts for each event group included in the signature groups. The candidate determination unit 243 outputs any collation purpose event group, for which the rate of detected hosts is equal to or less than a certain rate, as a detection purpose event group (Step S1005). Thereby, the candidate determination process executed by the event collation unit 242 and the candidate determination unit 243 is ended.

As described above, based on the number of detected hosts for each detection purpose event group candidate collated by the event collation unit 242, the candidate determination unit 243 outputs the detection purpose event group candidate as a detection purpose event group, if a rate of the number of detected hosts to the total number of hosts in the monitoring target NW is equal to or less than a certain rate. Similarly to the processing by the excluded event extraction unit 231, this is a process for excluding those that may lead to erroneous detection from detection event groups in advance, in consideration of the fact that in general, a monitoring target NW has few terminals infected with malware.

That is, if it is assumed that there are few terminals infected with malware in a monitoring target NW, a detection purpose event group candidate determined to be matched in this process is able to be regarded as an event group that is able to be confirmed, not only in communications of malware, but also in general communications, and thus the detection purpose event group candidate may be deemed to be an event group that tends to induce erroneous detection when the detection purpose event group candidate is used in detection. Therefore, by the processing by the candidate determination unit 243, where any event group of communications of malware difficult to be distinguished from general communications is excluded in advance, erroneous detection by the detection unit is able to be reduced. The detecting apparatus 200 may output, as a detection purpose event group, only any event group, for which a result of division of the number of detected hosts for each collation purpose event group determined to be matched by the event collation process by the number of hosts in the monitoring target NW is "0", that is, only any detection purpose event group candidate, for which an event group of the monitoring target NW analysis results (for combination extraction) has not been detected. Thereby, the detecting apparatus 200 enables those that may cause erroneous detection to be prevented from being added to detection purpose event groups.

(Detection Process)

Figure 17:
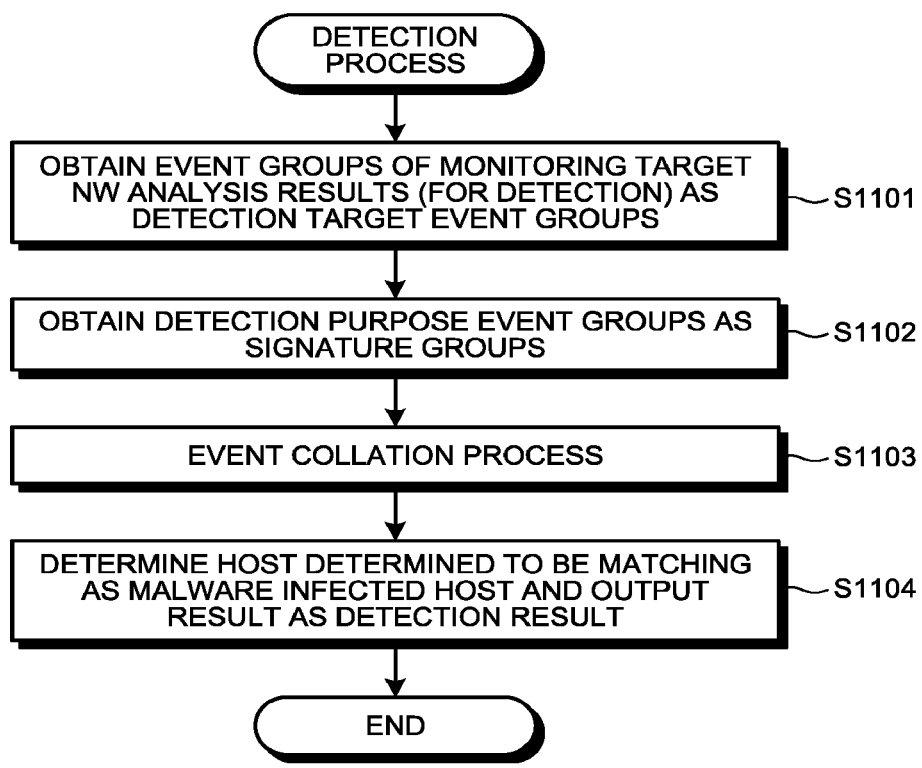
FIG. 17 is a flow chart illustrating a sequence of a detection process by a detection unit.

Next, by use of FIG. 17, a detection process executed by the detection unit 250 will be described. FIG. 17 is a flow chart illustrating a sequence of the detection process by the detection unit 250.

As illustrated in FIG. 17, the event collation unit 251 pertaining to the detection unit 250 obtains event groups of monitoring target NW analysis results (for detection) as detection target event groups (Step S1101). Further, the event collation unit 251 obtains detection purpose event groups extracted by the detection event group extraction unit 240, as signature groups (Step S1102). The event collation unit 251 then executes an event collation process for the obtained detection target event groups and the signature groups (Step S1103).

Subsequently, the detection result output unit 252 pertaining to the detection unit 250 determines, as a malware infected host, a host determined to be matching by the event collation process, and outputs a result thereof as a detection result (Step S1104). Thereby, the detection process executed by the detection unit 250 is ended.

As described above, the detection unit 250 collates event groups of monitoring target NW analysis results (for detection) generated by the generation unit 230 with detection purpose event groups extracted by the detection event group extraction unit 240. Thereby, since the detection unit 250 is able to perform collation between event groups excluding any event or event combination that is observable in the monitoring target NW in advance, erroneous detection of communications normally occurring in the monitoring target NW is able to be reduced and any malware infected terminal is able to be detected.

(Collation Process)

Next, by use of FIG. 18, a collation process executed by the event collation unit 251 pertaining to the detection unit 250 will be described. FIG. 18 is a flow chart illustrating a sequence of the collation process by the event collation unit 251. The event collation unit 242 pertaining to the detection event group extraction unit 240 also executes a process similar to the process described below.

As illustrated in FIG. 18, the event collation unit 251 obtains event groups of monitoring target NW analysis results (for detection) as detection target event groups (Step S1201). Further, the event collation unit 251 obtains detection purpose event groups extracted by the detection event group extraction unit 240, as signature groups (Step S1202).

The event collation unit 251 then determines whether or not determination on all of the detection target event groups has been executed (Step S1203). If the determination on all of the detection target event groups has been executed (Step S1203; Yes), the collation process by the event collation unit 251 is ended.

On the contrary, if the determination on all of the detection target event groups has not been performed (Step S1203; No), the event collation unit 251 obtains a determination target event group and host information from the detection target event groups (Step S1204). Based on the obtained host information, for the host to be subjected to detection, the event collation unit 251 determines whether or not determination with all of the signature groups has been executed (Step S1205). If the determination with all of the signature groups has been executed (Step S1205; Yes), the event collation unit 251 advances the process to Step S1203.

On the contrary, if the determination with all of the signature groups has not been performed (Step S1205; No), the event collation unit 251 obtains a collation purpose event group from the signature groups (Step S1206). The event collation unit 251 then obtains the number of events commonly confirmed between the determination target event group and the collation purpose event group (Step S1207).

Subsequently, the event collation unit 251 determines whether or not a value resulting from division of the number of events commonly confirmed by the number of events included in the collation purpose event group is larger than a prespecified value (Step S1208). If the value is larger than the prespecified value (Step S1208; Yes), the event collation unit 251 determines that the determination target event group and the collation purpose event group have matched each other (Step S1209).

On the contrary, if the value is not larger than the prespecified value (Step S1208; No), the event collation unit 251 determines that the determination target event group and the collation purpose event group have not matched each other (Step S1210).

The event collation unit 251 then outputs the collation purpose event group, host information of the determination target event group, and the determination result (Step S1211). The event collation unit 251 then advances the process to Step S1205.

As described above, the event collation unit 251 executes a collation process for a signature group, which is an event group extracted based on characteristic communication order of malware, with an event group to be subjected to detection. Thereby, the detecting apparatus 200 is able to detect any terminal infected with malware having a similar communication pattern with less erroneous detection.

Processing similar to that of the second embodiment may be realized by a detecting system including terminal devices and the detecting apparatus 200, in a monitoring target NW. In this case, predetermined events are generated in the monitoring target NW, and the detecting apparatus 200 obtains events for each of the terminal devices. Further, the malware infected terminal detecting system may include an information processing apparatus that virtually generates communications of malware. In this case, the detecting apparatus 200 included in the detecting system obtains the events generated by the information processing apparatus as malware analysis results.

[Effects of Second Embodiment]

As described above, the detecting apparatus 200 according to the second embodiment generates an event group formed of a combination of non-redundant events, from events, which are phenomena matching rules characterizing communications, and which are obtained for each identifier identifying a terminal in a monitoring target NW or a piece of malware, the events being from communications in the monitoring target NW and communications caused by malware. Further, for a cluster formed of event groups, which are based on communications caused by malware and have event group similarities therebetween equal to or larger than a certain similarity: when plural event groups are present in the same cluster, the detecting apparatus 200 takes out any event that appears commonly to the event groups belonging to the same cluster, and extracts a collection of the taken out events as a detection purpose event group if the number of types of the taken out events is equal to or larger than a certain number; or when only a single event group is present in the same cluster, the detecting apparatus 200 extracts the event group as a detection purpose event group if the number of types of events included in that event group is equal to or larger than a certain number. If it is determined that the generated event group based on the communications in the monitoring target NW matches the extracted detection purpose event group, the detecting apparatus 200 detects that a malware infected terminal is present in the monitoring target NW.

Thereby, the detecting apparatus 200 according to the second embodiment enables patterns for collation in a monitoring target NW to be reduced, and time taken for the collation to be reduced. Further, instead of treating communications of a single piece of malware as a signature, the detecting apparatus 200 treats a collection of events common to event groups clustered based on malware communication analysis results as a detection purpose event group (signature). Thereby, the detecting apparatus 200 enables accuracy in detection of any malware infected terminal to be improved. Furthermore, the detecting apparatus 200 will be able to detect not only any terminal infected with known malware, but also any terminal infected with malware of subspecies thereof that perform communications similar to the known malware.

Further, if a value resulting from division of the number of terminals in a monitoring target NW that have generated a predetermined event of events obtained for each terminal of the monitoring target NW by the total number of terminals observable in the monitoring target NW is larger than a certain value, the detecting apparatus 200 generates an even group with only events excluding that predetermined event.

Thereby, since the detecting apparatus 200 according to the second embodiment uses a detection purpose event group, from which any event or event combination that is observable in a monitoring target NW has been excluded in advance, erroneous detection of communications normally occurring in the monitoring target NW is able to be reduced.

Further, the detecting apparatus 200 generates an event group from events having event occurrence intervals therebetween that are not equal to or longer than a certain time period, the events being from events obtained for each of identifiers identifying terminals in a monitoring target NW and pieces of malware.

Thereby, the detecting apparatus 200 according to the second embodiment is able to separate a series of phenomena related to operation of malware, and enables accuracy in a detection process to be improved.

Further, the detecting apparatus 200 collates between event groups, which are an extracted detection purpose event group, and an event group based on communications in a monitoring target NW (for combination extraction) that has been obtained in advance, and if a value, which results from division of the number of terminals corresponding to the event group based on the communications in the monitoring target NW, the event group having been determined to be matching in the collation between the event groups, by the total number of terminals observable in the monitoring target NW, is equal to or larger than a certain value, the detecting apparatus 200 extracts, as new detection purpose event groups, the event groups, from which the detection purpose event group determined to be matched in the collation between the event groups has been excluded.

Thereby, the detecting apparatus 200 according to the second embodiment is able to more accurately generate a detection purpose event group that becomes a signature for detecting malware, and thus enables erroneous detection of malware to be reduced.

Further, if a value, which results from division of the number of events commonly appearing in events included in an event group based on communications in a monitoring target NW and a detection purpose event group by the total number of events included in the detection purpose event group, is equal to or larger than a certain value, the detecting apparatus 200 determines that the event group based on the communications in the monitoring target NW and the detection purpose event group match each other.

Thereby, the detecting apparatus 200 according to the second embodiment is able to appropriately perform collation between matching event groups for respective event groups to be compared with each other. As a result, the detecting apparatus 200 enables accuracy of event groups to be used in detection to be improved, and thus enables erroneous detection of malware to be reduced.

Further, the detecting system according to the second embodiment includes, in a monitoring target NW, the terminal devices and the detecting apparatus 200. The terminal devices generate predetermined communications in the monitoring target NW. From events, which are phenomena matching rules characterizing communications, and which are obtained for each identifier identifying a terminal device or a piece of malware, the events being from the predetermined communications generated by the terminal devices and communications caused by malware, the detecting apparatus 200 generates an event group that is formed of a combination of non-redundant events. Further, for a cluster formed of event groups, which are based on communications caused by malware and have event group similarities therebetween equal to or larger than a certain similarity: when plural event groups are present in the same cluster, the detecting apparatus 200 takes out any event that appears commonly to the event groups belonging to the same cluster, and extracts a collection of the taken out events as a detection purpose event group if the number of types of the taken out events is equal to or larger than a certain number; or when only a single event group is present in the same cluster, the detecting apparatus 200 extracts the event group as a detection purpose event group if the number of types of events included in that event group is equal to or larger than a certain number. Further, if it is determined that an event group based on communications of a terminal device matches an extracted detection purpose event group, the detecting apparatus 200 detects that a malware infected terminal is present in the monitoring target NW.

Thereby, the detecting system according to the second embodiment enables signatures that become patterns for collation in a monitoring target NW to be reduced, time taken for the collation to be reduced, and malware of subspecies that perform communications similar to those of known malware to be detected.

[Configuration and the Like]

Each component of the respective devices is functionally and conceptionally illustrated, and is not necessarily physically configured as illustrated in the drawings. That is, specific modes of distribution and integration of the respective devices are not limited to those illustrated in the drawings, and depending on various loads and use situations, all or a part of the devices may be configured to be functionally or physically distributed or integrated in arbitrary units. Further, all or any part of the processing functions executed by the respective devices may be realized by a CPU and a program analyzed and executed by the CPU, or may be implemented as hardware by wired logic.

Further, of the respective processes described in the embodiments, all or a part of any process described as being executed automatically may be executed manually, or all or a part of any process described as being executed manually may be executed automatically by a known method. In addition, the procedural sequences, control sequences, specific names, and information including various data and parameters, which have been described above and illustrated in the drawings may be arbitrarily modified unless otherwise particularly stated.

(Program)

Further, a program, which describes the processing executed by the detecting apparatus 100 or 200 according to the above described embodiment in a language executable by a computer, may be generated. In this case, by the computer executing the program, effects that are the same as those of the above described embodiment are able to be obtained. Further, by recording this program in a computer readable recording medium, and causing the computer to load and execute the program recorded in this recording medium, processing that is the same as that of the above described embodiment may be realized. Hereinafter, an example of a computer, which executes a detecting program that realizes functions that are the same as those of the detecting apparatus 100 or 200, will be described.

FIG. 19 is a diagram illustrating a computer that executes a malware infected terminal detecting program. As illustrated in FIG. 19, a computer 1000 has, for example, a memory 1010, a central processing unit (CPU) 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein a boot program, such as Basic Input Output System (BIOS), for example. The hard disk drive interface 1030 is connected to a hard disk drive 1090. The disk drive interface 1040 is connected to a disk drive 1041. An attachable and detachable storage medium, such as a magnetic disk or an optical disk, for example, is inserted in the disk drive 1041. A mouse 1110 and a keyboard 1120, for example, are connected to the serial port interface 1050. A display 1130, for example, is connected to the video adapter 1060.

As illustrated in FIG. 19, the hard disk drive 1090 stores therein, for example, an OS 1091, an application program 1092, a program module 1093, and program data 1094. Each piece of information described in the above embodiment is stored in, for example, the hard disk drive 1090, or the memory 1010.

Further, the detecting program is stored, for example, as a program module, in which commands executed by the computer 1000 are described, in the hard disk drive 1090. Specifically, a program module, in which the processing executed by the detecting apparatus 100 or 200 described in the above embodiment is described, is stored in the hard disk drive 1090.

Further, data used in information processing by the detecting program are stored as program data in, for example, the hard disk drive 1090. The CPU 1020 loads the program module 1093 and the program data 1094 stored in the hard disk drive 1090 as necessary into the RAM 1012, and executes the above described sequences.

The program module 1093 and the program data 1094 related to the detecting program are not necessarily stored in the hard disk drive 1090, and for example, may be stored in an attachable and detachable storage medium and read out by the CPU 1020 via the disk drive 1041 or the like. Or, the program module 1093 and the program data 1094 related to the detecting program may be stored in another computer connected via a network, such as a local area network (LAN) or a wide area network (WAN), and read out by the CPU 1020 via the network interface 1070.

REFERENCE SIGNS LIST 100, 200 DETECTING APPARATUS
130 SERIES GENERATION UNIT
131, 231 EXCLUDED EVENT EXTRACTION UNIT
132 EVENT SERIES GENERATION UNIT
140 DETECTION PURPOSE SERIES EXTRACTION UNIT
141 COMMON EVENT SERIES EXTRACTION UNIT
142, 242 EVENT COLLATION UNIT
143, 243 CANDIDATE DETERMINATION UNIT
150, 250 DETECTION UNIT
151, 251 EVENT COLLATION UNIT
152, 252 DETECTION RESULT OUTPUT UNIT
230 GENERATION UNIT
232 EVENT GROUP GENERATION UNIT
240 DETECTION EVENT GROUP EXTRACTION UNIT
241 COMMON EVENT GROUP EXTRACTION UNIT

The invention claimed is:

1. A malware infected terminal detecting apparatus, comprising:
processing circuitry configured to
generate a collection of events, the collection being formed based on a predetermined condition, from events that are phenomena matching rules characterizing communications from communications in a monitoring target network and communications caused by malware and that are obtained for each identifier identifying a terminal in the monitoring target network or a piece of malware;
for a cluster formed of collections of events that are based on the communications caused by malware, the collections having an event collection similarity therebetween equal to or larger than a certain similarity:
when plural collections of events are present in the same cluster, take out events appearing commonly in the collections of events belonging to the same cluster, and extract, according to a predetermined condition, a collection of the taken out events as a detection purpose event series candidate; or
when only a single collection of events is present in the same cluster, extract the collection of events as a detection purpose event series candidate if a predetermined condition is satisfied;
extract a collection of detection purpose events from the detection purpose event series candidate, if a rate of the number of detected hosts to the total number of hosts in the monitoring target network is equal to or less than a certain rate; and
detect that a malware infected terminal is present in the monitoring target network, if the generated collection of events based on the communications in the monitoring target network has been determined to match the extracted collection of detection purpose events, wherein
the processing circuitry collates the extracted collection of detection purpose events with the collection of events that have been obtained in advance and that are based on the communications in the monitoring target network, and
if a value, which results from division of the number of terminals corresponding to the collection of events based on the communications in the monitoring target network determined to be matching in the collation between the collections of events by the total number of terminals observable in the monitoring target network, is equal to or larger than a certain value, the processing circuitry extracts, as a new collection of detection purpose events, a collection of events, from which the collection of detection purpose events determined to be matched in the collation between the collections of events has been excluded, the collection of detection purpose events being from the extracted collections of detection purpose events, wherein
the processing circuitry determines that any collection of events confirmed in at least a threshold number of the hosts, determined based on the certain value, does not capture only characteristics of communications due to malware, extracts that collection of events, and sets the collection of events as an excluded event.

2. The malware infected terminal detecting apparatus according to claim 1, wherein the processing circuitry generates, as the collection of events, an event series formed in consideration of order of occurrence of the events, for a cluster formed of event series that are based on the communications caused by malware and that have an event series similarity therebetween equal to or larger than a certain similarity:

when plural event series are present in the same cluster, the processing circuitry takes out events commonly appearing in the event series belonging to the same cluster, and extracts, as a detection purpose event series, an event series that is a combination of the taken out events in time series order and that has a length equal to or longer than a certain length; or when only a single event series is present in the same cluster, the processing circuitry extracts that event series as a detection purpose event series if that event series has a length equal to or longer that a certain length, and the processing circuitry detects that a malware infected terminal is present in the monitoring target network, if the generated event series based on the communications in the monitoring target network has been determined to match the extracted detection purpose event series.

3. The malware infected terminal detecting apparatus according to claim 2, wherein the processing circuitry determines that the event series based on the communications in the monitoring target network matches the detection purpose event series, if a value, which results from division of a length of the longest part of a part common to the event series based on the communications in the monitoring target network and the detection purpose event series by a length of the detection purpose event series, is equal to or larger than a certain value.

4. The malware infected terminal detecting apparatus according to claim 2, wherein the processing circuitry generates the event series by excluding any redundantly appearing event from events obtained for each of identifiers identifying terminals in the monitoring target network and pieces of malware.

5. The malware infected terminal detecting apparatus according to claim 1, wherein the processing circuitry generates, as the collection of events, an event group formed of a combination of non-redundant events, for a cluster formed of event groups that are based on the communications caused by malware and have an event group similarity therebetween equal to or larger than a certain similarity:

when plural event groups are present in the same cluster, the processing circuitry takes out events commonly appearing in the event groups belonging to the same cluster, and extracts, as a detection purpose event group, a collection of the taken out events if the number of types of the taken out events is equal to or larger than a certain number; or when only a single event group is present in the same cluster, the processing circuitry extracts that event group as a detection purpose event group if the number of types of events included in that event group is equal to or larger than a certain number, and the processing circuitry detects that a malware infected terminal is present in the monitoring target network, if the generated event group based on the communications in the monitoring target network has been determined to match the extracted detection purpose event group.

6. The malware infected terminal detecting apparatus according to claim 5, wherein the processing circuitry determines that the event group based on the communications in the monitoring target network matches the detection purpose event group, if a value, which results from division of the number of events commonly appearing in events included in the event group based on the communications in the monitoring target network and the detection purpose event group by the total number of events included in the detection purpose event group, is equal to or larger than a certain value.

7. The malware infected terminal detecting apparatus according to claim 1, wherein if a value, which results from division of the number of terminals in the monitoring target network that have generated a predetermined event of events obtained for each terminal in the monitoring target network by the total number of terminals observable in the monitoring target network, is larger than a certain value, the processing circuitry generates the collection of events with only those events excluding the predetermined event.

8. The malware infected terminal detecting apparatus according to claim 1, wherein the processing circuitry generates a collection of events from events that are from events obtained for each identifier identifying a terminal in the monitoring target network or a piece of malware and that have an event occurrence interval therebetween not equal to or longer than a certain time period.

9. A malware infected terminal detecting method executed by a malware infected terminal detecting apparatus, the malware infected terminal detecting method including:

generating a collection of events, the collection being formed based on a predetermined condition, from events that are phenomena matching rules characterizing communications from communications in a monitoring target network and communications caused by malware and that are obtained for each identifier identifying a terminal in the monitoring target network or a piece of malware;

an extraction process of, for a cluster formed of collections of events that are based on the communications caused by malware, the collections having an event collection similarity therebetween equal to or larger than a certain similarity:

when plural collections of events are present in the same cluster, taking out events appearing commonly in the collections of events belonging to the same cluster, and extracting, according to a predetermined condition, a collection of the taken out events as a detection purpose event series candidate; or when only a single collection of events is present in the same cluster, extracting the collection of events as detection purpose event series candidate if a predetermined condition is satisfied;

extracting a collection of detection purpose events from the detection purpose event series candidate, if a rate of the number of detected hosts to the total number of hosts in the monitoring target network is equal to or less than a certain rate; and a detection process of detecting that a malware infected terminal is present in the monitoring target network, if a collection of events generated by the generation process and based on the communications in the monitoring target network has been determined to match the collection of detection purpose events extracted by the extraction process, wherein the method includes collating the extracted collection of detection purpose events with the collection of events that have been obtained in advance and that are based on the communications in the monitoring target network, and if a value, which results from division of the number of terminals corresponding to the collection of events based on the communications in the monitoring target network determined to be matching in the collation between the collections of events by the total number of terminals observable in the monitoring target network, is equal to or larger than a certain value, the method includes extracting, as a new collection of detection purpose events, a collection of events, from which the collection of detection purpose events determined to be matched in the collation between the collections of events has been excluded, the collection of detection purpose events being from the extracted collections of detection purpose events, wherein the method further includes determining that any collection of events confirmed in at least a threshold number of the hosts, determined based on the certain value, does not capture only characteristics of communications due to malware, extracts that collection of events, and sets the collection of events as an excluded event.

10. A non-transitory computer-readable recording medium having stored a malware infected terminal detecting program for causing a computer to execute a method comprising:

generating a collection of events, the collection being formed based on a predetermined condition, from events that are phenomena matching rules characterizing communications from communications in a monitoring target network and communications caused by malware and that are obtained for each identifier identifying a terminal in the monitoring target network or a piece of malware;

an extraction step of, for a cluster formed of collections of events that are based on the communications caused by malware, the collections having an event collection similarity therebetween equal to or larger than a certain similarity:

when plural collections of events are present in the same cluster, taking out events appearing commonly in the collections of events belonging to the same cluster, and extracting, according to a predetermined condition, a collection of the taken out events as a detection purpose event series candidate; or when only a single collection of events is present in the same cluster, extracting the collection of events as a detection purpose event series candidate if a predetermined condition is satisfied;

extracting a collection of detection purpose events from the detection purpose event series candidate, if a rate of the number of detected hosts to the total number of hosts in the monitoring target network is equal to or less than a certain rate; and a detection step of detecting that a malware infected terminal is present in the monitoring target network, if a collection of events generated by the generation step and based on the communications in the monitoring target network has been determined to match the collection of detection purpose events extracted by the extraction step, wherein the method includes collating the extracted collection of detection purpose events with the collection of events that have been obtained in advance and that are based on the communications in the monitoring target network, and if a value, which results from division of the number of terminals corresponding to the collection of events based on the communications in the monitoring target network determined to be matching in the collation between the collections of events by the total number of terminals observable in the monitoring target network, is equal to or larger than a certain value, the method includes extracting, as a new collection of detection purpose events, a collection of events, from which the collection of detection purpose events determined to be matched in the collation between the collections of events has been excluded, the collection of detection purpose events being from the extracted collections of detection purpose events, wherein the method further includes determining that any collection of events confirmed in at least a threshold number of the hosts, determined based on the certain value, does not capture only characteristics of communications due to malware, extracts that collection of events, and sets the collection of events as an excluded event.

* * * * *